(12) United States Patent
Detournay et al.

(10) Patent No.: US 11,321,506 B2
(45) Date of Patent: May 3, 2022

(54) FAST ALGORITHM TO SIMULATE THE RESPONSE OF PDC BITS

(71) Applicants: Regents of the University of Minnesota, Minneapolis, MN (US); HALLIBURTON ENERGY SERVICES, INC., Houston, TX (US)

(72) Inventors: Emmanuel Detournay, Roseville, MN (US); Ganesh Ramakrishnan, Houston, TX (US); Kaixiao Tian, Falcon Heights, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 303 days.

(21) Appl. No.: 16/573,926

(22) Filed: Sep. 17, 2019

(65) Prior Publication Data
US 2021/0081506 A1 Mar. 18, 2021

(51) Int. Cl.
*G06F 30/20* (2020.01)
*E21B 41/00* (2006.01)
(Continued)

(52) U.S. Cl.
CPC .......... *G06F 30/20* (2020.01); *E21B 41/0092* (2013.01); *E21B 10/42* (2013.01); *G06F 2111/10* (2020.01)

(58) Field of Classification Search
USPC .......................................................... 703/7
See application file for complete search history.

(56) References Cited

U.S. PATENT DOCUMENTS

| 5,216,917 A * | 6/1993 | Detournay | E21B 49/003 |
| | | | 73/152.59 |
| 6,729,420 B2 * | 5/2004 | Mensa-Wilmot | E21B 10/26 |
| | | | 175/327 |

(Continued)

OTHER PUBLICATIONS

Mohan Sivagnanam (PDC Drill Bit Redesign and Simulation for Optimized Performance,2014, University of Calgary, pp. 1-148) (Year: 2014).*

(Continued)

*Primary Examiner* — Iftekhar A Khan
(74) *Attorney, Agent, or Firm* — Polsinelli PC

(57) ABSTRACT

Systems, methods, and computer-readable media are provided for simulating the coupled axial/torsional dynamics of drilling systems. An example method can include calculating a profile of a bit including cutters, the profile including a cutter layout representing cutter faces of the cutters; based on the profile of the bit, determining cutter interactions between cutters, a cutter interaction being determined when at least two cutters interact with a same surface portion; approximating a cutter geometry of each cutter using polygon approximation; based on the cutter interactions and approximated cutter geometry of each cutter, calculating an engagement surface for each cutter using polygon approximation; and based on geometric parameters associated with the engagement surface for each cutter, simulating reaction forces on the bit at a plurality of time steps corresponding to constant increments of an angular position of the bit during each revolution of the bit, the reaction forces including weight-on-bit and torque-on-bit.

17 Claims, 17 Drawing Sheets

(51) Int. Cl.
*E21B 10/42* (2006.01)
*G06F 111/10* (2020.01)

(56) References Cited

U.S. PATENT DOCUMENTS

| | | | | |
|---|---|---|---|---|
| 6,785,641 B1* | 8/2004 | Huang | | E21B 10/00 |
| | | | | 175/45 |
| 7,097,396 B1* | 8/2006 | Miyanaga | | B23B 31/005 |
| | | | | 175/415 |
| 7,251,590 B2* | 7/2007 | Huang | | E21B 44/00 |
| | | | | 703/2 |
| 7,441,612 B2* | 10/2008 | Durairajan | | E21B 10/42 |
| | | | | 175/431 |
| 7,464,013 B2* | 12/2008 | Huang | | G06F 30/20 |
| | | | | 703/7 |
| 7,693,695 B2* | 4/2010 | Huang | | E21B 10/00 |
| | | | | 703/7 |
| 7,831,419 B2* | 11/2010 | Cariveau | | E21B 10/00 |
| | | | | 703/7 |
| 7,844,426 B2* | 11/2010 | Huang | | E21B 44/00 |
| | | | | 703/6 |
| 8,720,611 B2* | 5/2014 | Chen | | G06F 30/20 |
| | | | | 175/398 |
| 8,752,656 B2* | 6/2014 | Zhang | | E21B 10/567 |
| | | | | 175/434 |
| 9,115,552 B2* | 8/2015 | Chen | | E21B 10/42 |
| 9,249,654 B2* | 2/2016 | Strachan | | E21B 44/00 |
| 9,482,055 B2* | 11/2016 | Huang | | E21B 44/00 |
| 9,556,683 B2* | 1/2017 | Simmons | | E21B 10/567 |
| 10,119,337 B2* | 11/2018 | Ling | | G06F 30/17 |
| 10,428,587 B2* | 10/2019 | Chen | | E21B 10/43 |
| 10,526,850 B2* | 1/2020 | Chen | | E21B 10/55 |
| 10,753,155 B2* | 8/2020 | Maurstad | | E21B 10/43 |
| 2002/0157869 A1* | 10/2002 | Glass | | E21B 10/16 |
| | | | | 175/40 |
| 2005/0015229 A1* | 1/2005 | Huang | | E21B 10/16 |
| | | | | 703/10 |
| 2006/0180356 A1* | 8/2006 | Durairajan | | G06F 30/20 |
| | | | | 175/431 |
| 2008/0264695 A1* | 10/2008 | Zahradnik | | E21B 10/14 |
| | | | | 175/336 |
| 2010/0259415 A1* | 10/2010 | Strachan | | G05B 13/048 |
| | | | | 340/853.6 |
| 2015/0337640 A1* | 11/2015 | Huang | | G06F 30/20 |
| | | | | 703/10 |
| 2016/0123118 A1* | 5/2016 | Downton | | E21B 7/00 |
| | | | | 703/7 |
| 2016/0154129 A1* | 6/2016 | Sayers | | G01V 1/306 |
| | | | | 702/13 |
| 2017/0004235 A1* | 1/2017 | Samuel | | E21B 10/42 |
| 2017/0074045 A1* | 3/2017 | Chen | | G06F 30/17 |
| 2017/0211356 A1* | 7/2017 | Samuel | | E21B 41/00 |
| 2017/0328180 A1* | 11/2017 | da Silva | | E21B 10/48 |
| 2018/0088552 A1* | 3/2018 | Dow | | G01N 3/58 |
| 2018/0189429 A1* | 7/2018 | Viard | | G06F 30/20 |
| 2020/0362686 A1* | 11/2020 | Puwanto | | E21B 21/10 |
| 2021/0081506 A1* | 3/2021 | Detournay | | G06F 30/20 |

OTHER PUBLICATIONS

Pelfrene et al. (Modelling the 3D Bit-Rock Interaction Helps Designing Better PDC Bits, 2019, SPE, pp. 1-18) (Year: 2019).*

* cited by examiner $$
\begin{array}{c|cccc}
0 & & & & \\
c_2 & a_{21} & & & \\
c_3 & a_{31} & a_{32} & & \\
\vdots & \vdots & & \ddots & \\
c_s & a_{s1} & a_{s2} & \cdots & a_{s,s-1} \\
\hline
 & b_1 & b_2 & \cdots & b_{s-1} & b_s
\end{array}
$$

The second and the fourth order integration can read as:

Equation (18).

FAST ALGORITHM TO SIMULATE THE RESPONSE OF PDC BITS

TECHNICAL FIELD

The present technology pertains to rotary drilling systems and, more specifically, to simulating the response of drag bits in rotary drilling systems.

BACKGROUND

Rotary drilling systems used to drill deep boreholes for hydrocarbon exploration and production often experience severe torsional vibrations, called stick-slip, which are characterized by sticking phases where the bit stops, and slipping phases where the angular velocity of the tool increases up to two times the imposed angular velocity. This problem is particularly acute with drag bits, which have fixed blades or cutters mounted on the surface of a bit body. Such stick-slip torsional oscillations can be very detrimental to the drilling system and can lead to failure of the bit and fatigue of the drill string connections.

Typically, stick-slip oscillations can be caused by a regenerative effect. For example, in a bit with a number of symmetric blades, the depth of cut or the height of rock ahead of the cutting blade can be the difference between the current axial bit position and the axial bit position at a past instant corresponding to the presence of the previous cutting blade at the current angular position. Thus, any perturbation in the axial motion of the bit affects, with a time delay, the depth of cut and, consequently, the reaction force on the bit. Under certain conditions, this delayed feedback causes a growth of the perturbation in the axial motion of the bit, causing the system to lose stability, eventually leading to stick-slip torsional oscillations.

The stability of the motion of the bit and the existence of a limit cycle corresponding to torsional stick-slip oscillations can depend on the bit design. Thus, when calculating the stability of a particular bit design, the actual cutter layout can have a significant impact on the accuracy of such calculations. However, current solutions for calculating the stability of drilling systems fail to account for the actual bit design and cutter layout, and there is a lack in tools for accurately and efficiently estimating and incorporating a realistic bit geometry and cutter layout. This is partly because drag or PDC (polycrystalline diamond compact) bits have a very complex arrangement of cutters, which are often responsible for multiple delays and a delay distribution that depends on the bit penetration per revolution, and are extremely difficult to model or simulate. Moreover, calculating the forces acting on each cutter of a bit can be a highly compute-intensive process.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
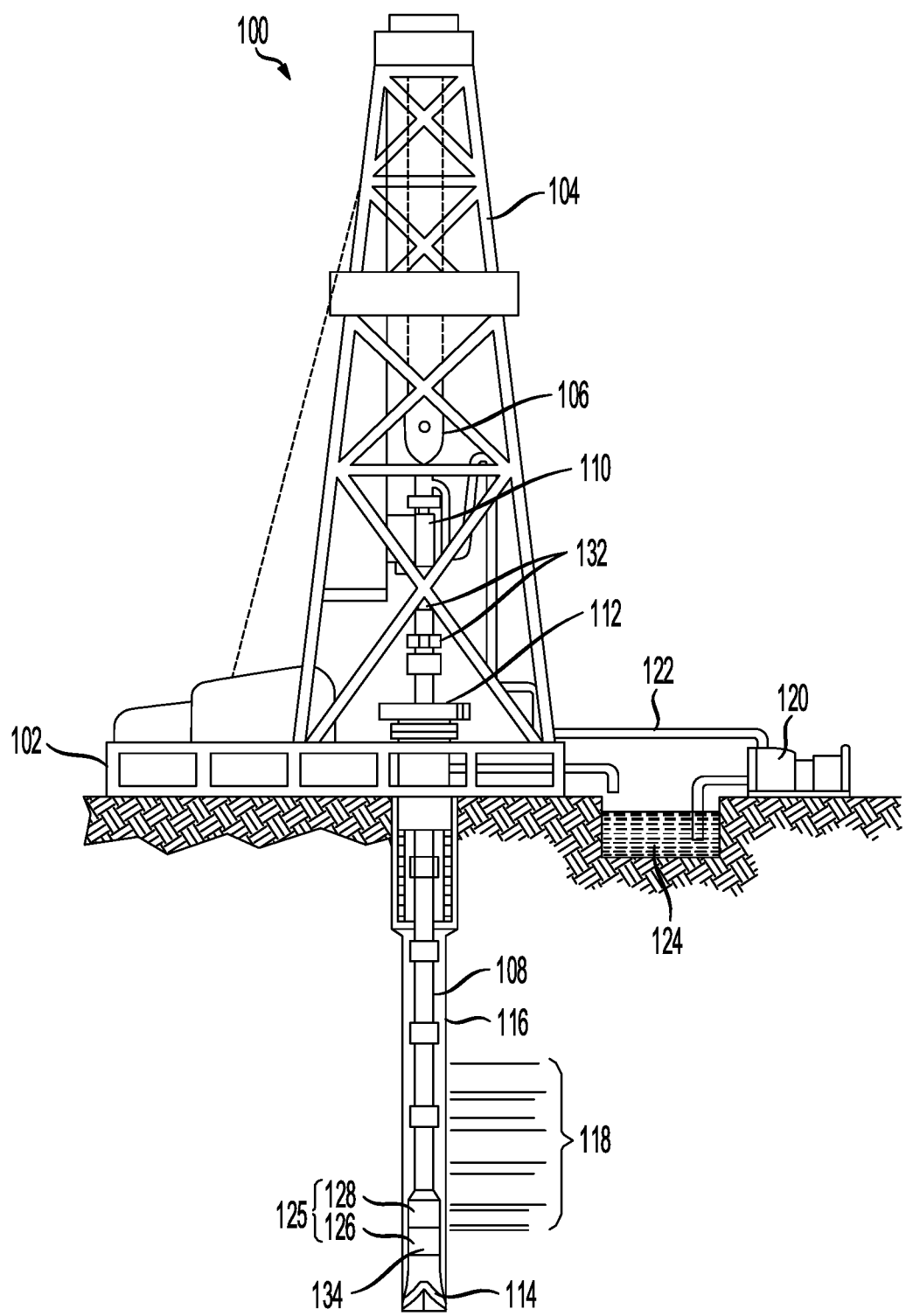
FIG. 1A is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed are systems, methods, and computer-readable storage media for fast, accurate algorithms and technologies to simulate the response of PDC (polycrystalline diamond compact) bits used by rotary drilling systems to drill boreholes. As previously explained, rotary drilling systems used to drill boreholes for hydrocarbon exploration and production often experience severe torsional vibrations. Torsional vibrations, also called stick-slip, are generally characterized by sticking phases where the bit stops, and slipping phases where the angular velocity of the tool increases up to two times the imposed angular velocity. This problem is particularly acute with drag bits, which have fixed blades or cutters mounted on the surface of a bit body. Such stick-slip torsional oscillations can be very detrimental to the drilling system and can lead to failure of the bit and fatigue of the drill string connections.

Stick-slip oscillations can be caused by a regenerative effect. For example, in a bit with a number of symmetric blades, the depth of cut or the height of rock ahead of the cutting blade can be the difference between the current axial bit position and the axial bit position at a past instant corresponding to the presence of the previous cutting blade at the current angular position. Thus, any perturbation in the axial motion of the bit affects, with a time delay, the depth of cut and, consequently, the reaction force on the bit. Under certain conditions, this delayed feedback causes a growth of the perturbation in the axial motion of the bit, causing the system to lose stability, eventually leading to stick-slip torsional oscillations. For an idealized bit, which is characterized by a single (or unique) angular delay (e.g., the constant angle between two blades), there is a certain rotational speed which is a function of the number of blades, below which the system is unstable.

The stability of the motion of the bit and the existence of a limit cycle corresponding to torsional stick-slip oscillations can depend on the bit design. Thus, when calculating the stability of a particular bit design, the actual cutter layout and bit design can have a significant impact on the accuracy of such calculations. However, it can be very difficult to calculate the actual bit design and cutter layout, or estimate and incorporate a realistic bit geometry and cutter layout when calculating the stability of a bit design. This is partly because drag or PDC (polycrystalline diamond compact) bits have a very complex arrangement of cutters, which are often responsible for multiple delays and a delay distribution that depends on the bit penetration per revolution, and are extremely difficult to model or simulate.

To incorporate a realistic bit geometry in a simulation or model, the approaches herein can consider multiple angular delays and relative heights between cutters. Multiple angular delays introduce multiple time delays in the governing equations of motion, while multiple relative heights result in the dependence of angular delays on the bit motion. The time delays are not known a priori, however, the time delays can be computed by inverting the history of the bit motion. Furthermore, the complex cutter layout on the bit implies that the cross-section of the groove traced by any cutter (referred to as the engagement surface) has a complicated time-dependent shape. The geometry of the engagement surface is directly related to the forces acting on the cutter. The forces on all the cutters can thus be used to integrate the equations of motion.

The existence of multiple time delays, the process of calculating the forces acting on each cutter of a bit, and the use of very small time steps (e.g., corresponding to a large number of time steps of order $O(10^3 \sim 10^4)$ for each revolution of the bit) can lead to highly compute-intensive calculations or operations and an overall time-consuming process. However, the approaches and technologies herein can significantly increase the speed, accuracy and efficiency of such calculations, operations, and process. In some aspects, the approaches and technologies herein can provide fast and accurate algorithms and technologies to simulate the response of PDC (polycrystalline diamond compact) bits used by rotary drilling systems to drill boreholes. Moreover, the approaches and technologies herein can accurately and efficiently estimate and incorporate a realistic or actual bit geometry and cutter layout when calculating the stability of drilling systems.

In some examples, the approaches and technologies herein can use a technique for geometric modeling such as "polygon clipping", to efficiently calculate the shape and size of the engagement surface on each cutter, as well as the length and shape of the cutting edge. This can enable fast and accurate calculation of the engagement surface and cutting edge, and thus the force on the cutter at each time step. The approaches and technologies herein can also use an adaptive time stepping corresponding to a constant increment of the angular position to integrate the equations of motion. An angle-based algorithm can be implemented to take advantage of the a priori known distribution of angular delays (e.g., as a function of the depth of cut). The compute-intensive search of the time delay can thus be reduced to an indexing problem.

According to at least one example, a method for fast and accurate algorithms and technologies to simulate the response of PDC bits used by rotary drilling systems to drill boreholes is provided. The method can include calculating a profile of a bit including a plurality of cutters, the profile of the bit including a cutter layout representing a collection of cutter faces associated with the plurality of cutters; based on the profile of the bit, determining potential cutter interactions between the plurality of cutters, the potential cutter interaction being determined when at least two cutters interact with a same portion of a surface; approximating a cutter geometry of each cutter using polygon approximation; based on the potential cutter interactions and the approximated cutter geometry of each cutter, calculating an engagement surface for each cutter using polygon approximation; and based on one or more geometric parameters associated with the engagement surface calculated for each cutter, simulating, via one or more processors, reaction forces on the bit at each of a plurality of time steps corresponding to constant increments of an angular position of the bit during each revolution of the bit, the reaction forces including weight-on-bit and torque-on-bit.

In another example, a system for fast and accurate algorithms and technologies to simulate the response of PDC bits used by rotary drilling systems to drill boreholes is provided. The system can include one or more processors and at least one computer-readable storage medium having stored therein instructions which, when executed by the one or more processors, cause the system to calculate a profile of a bit including a plurality of cutters, the profile of the bit including a cutter layout representing a collection of cutter faces associated with the plurality of cutters; based on the profile of the bit, determine potential cutter interactions between the plurality of cutters, wherein a potential cutter interaction is determined when at least two cutters interact with a same portion of a surface; approximate a cutter geometry of each cutter using polygon approximation; based on the potential cutter interactions and the approximated cutter geometry of each cutter, calculate an engagement surface for each cutter using polygon approximation; and based on one or more geometric parameters associated with the engagement surface calculated for each cutter, simulate reaction forces on the bit at each of a plurality of time steps corresponding to constant increments of an angular position of the bit during each revolution of the bit, the reaction forces including weight-on-bit and torque-on-bit.

In another example, a non-transitory computer-readable storage medium for fast, accurate algorithms and technologies to simulate the response of PDC bits used by rotary drilling systems to drill boreholes is provided. The non-transitory computer-readable storage medium can include instructions which, when executed by one or more processors, cause the one or more processors to calculate a profile of a bit including a plurality of cutters, the profile of the bit including a cutter layout representing a collection of cutter faces associated with the plurality of cutters; based on the profile of the bit, determine potential cutter interactions between the plurality of cutters, wherein a potential cutter interaction is determined when at least two cutters interact with a same portion of a surface; approximate a cutter geometry of each cutter using polygon approximation; based on the potential cutter interactions and the approximated cutter geometry of each cutter, calculate an engagement surface for each cutter using polygon approximation; and based on one or more geometric parameters associated with the engagement surface calculated for each cutter, simulate reaction forces on the bit at each of a plurality of time steps corresponding to constant increments of an angular position of the bit during each revolution of the bit, the reaction forces including weight-on-bit and torque-on-bit.

In yet another example, a system or apparatus for fast and accurate algorithms and technologies to simulate the response of PDC bits used by rotary drilling systems to drill boreholes is provided. The system or apparatus can include means for calculating a profile of a bit including a plurality of cutters, the profile of the bit including a cutter layout representing a collection of cutter faces associated with the plurality of cutters; based on the profile of the bit, determining potential cutter interactions between the plurality of cutters, wherein a potential cutter interaction is determined when at least two cutters interact with a same portion of a surface; approximating a cutter geometry of each cutter using polygon approximation; based on the potential cutter interactions and the approximated cutter geometry of each cutter, calculating an engagement surface for each cutter using polygon approximation; and based on one or more geometric parameters associated with the engagement surface calculated for each cutter, simulating reaction forces on the bit at each of a plurality of time steps corresponding to constant increments of an angular position of the bit during each revolution of the bit, the reaction forces including weight-on-bit and torque-on-bit.

In some aspects, the systems, methods, and non-transitory computer-readable storage media described above can include monitoring state variables at each time step for discontinuities. The discontinuities can include, for example, axial and torsional stick conditions. Moreover, the state variables can include, for example, an axial velocity and/or a rotational speed.

In some aspects, the engagement surface for each cutter can be calculated at each of the plurality of time steps. Moreover, calculating the engagement surface can include, for example, calculating a size and shape of the engagement surface on each cutter. The engagement surface can be calculated based on, for example, a current angular position of the bit, a current axial position of the bit, an axial bit advance, a time delay, and/or a past axial position of one or more cutters when the one or more cutters were at a current angular position of a respective cutter associated with a respective engagement surface being calculated.

In some examples, the engagement surface can be calculated by determining an intersection of engagement surfaces associated with two or more of the plurality of cutters. In some cases, the engagement surface of a cutter can be calculated by projecting nodes of a polygon describing the cutter, shifting the projection of nodes of the polygon describing the cutter to yield a shifted projection of nodes of the polygon, and calculating a difference between the projection of nodes of the polygon and the shifted projection of nodes of the polygon.

In some cases, calculating the profile of the bit can include depicting the bit and a cutter motion on a coordinate system, rotating the bit without axial advance, and projecting a face of each cutter onto a half-plane when a center of each cutter crosses the half-plane. Moreover, the bit profile can be calculated based on, for example, a number of cutters on the bit, a bit axis of rotation, an axial position of the bit, an angular position of the bit, a cutter face orientation, a cutter radius, a motion of the bit, etc.

In some examples, the one or more geometric parameters associated with the engagement surface can include a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width. Also, in some examples, approximating the engagement surface geometry of each cutter can include calculating a bit and/or cutter geometry, calculating a cutter engagement surface(s) using a bit motion history, and extracting geometric information to calculate a cut area associated with the cutter, a distance to the centroid, and a length and shape of a cutting boundary associated with the cutter.

In some aspects, the systems, methods, and non-transitory computer-readable storage media described above can account for a worn bit or cutter(s) when simulating reaction forces. In some examples, this can be done by replacing the circular cutter associated with a bit with a "truncated circle", and changing the wearflat surfaces of the worn cutter(s) accordingly.

Figure 11A:
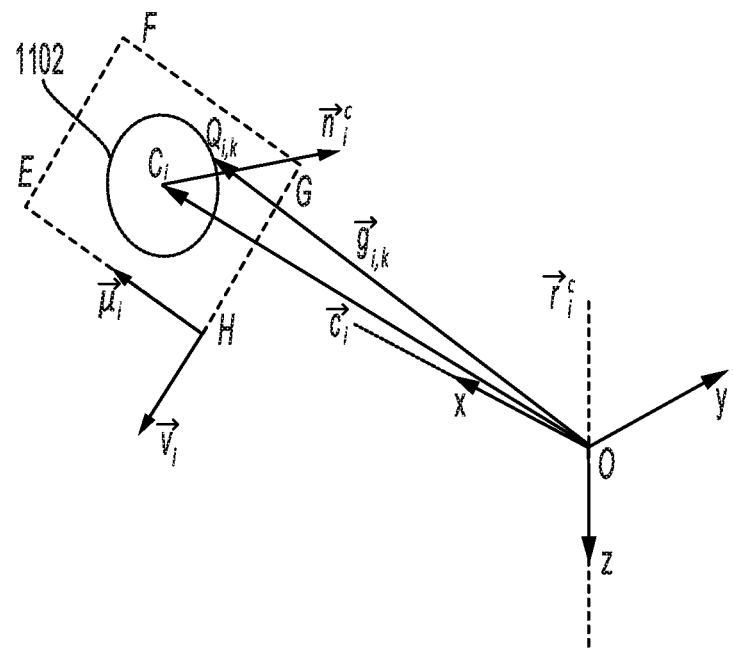
FIGS. 11A-C are example diagrams for projecting cutter faces for modeling bit/rock interactions, in accordance with some examples.
Figure 12:
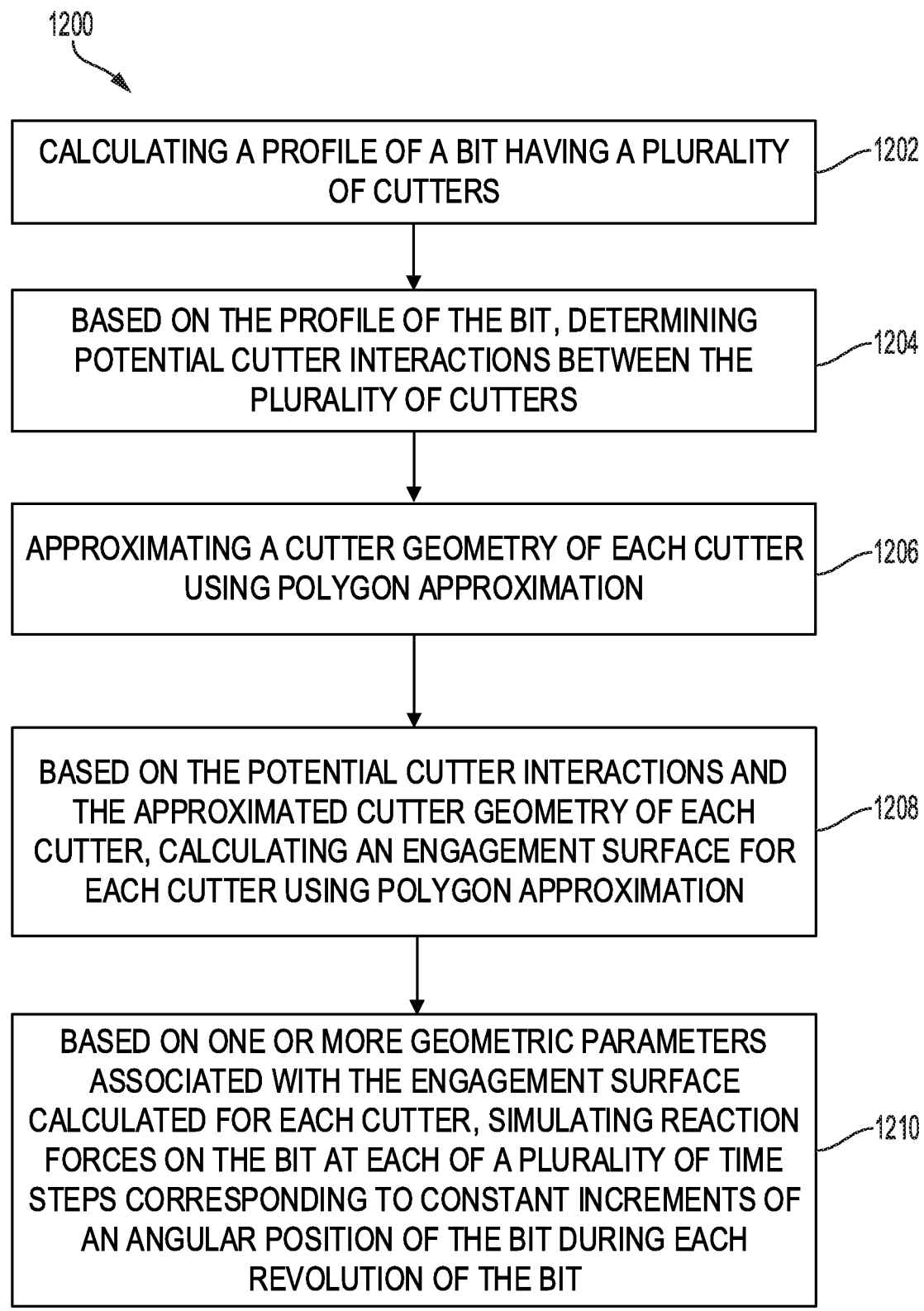
FIG. 12 is a flowchart of an example method for simulating the response of a bit in a drilling system, in accordance with some examples.
Figure 13:
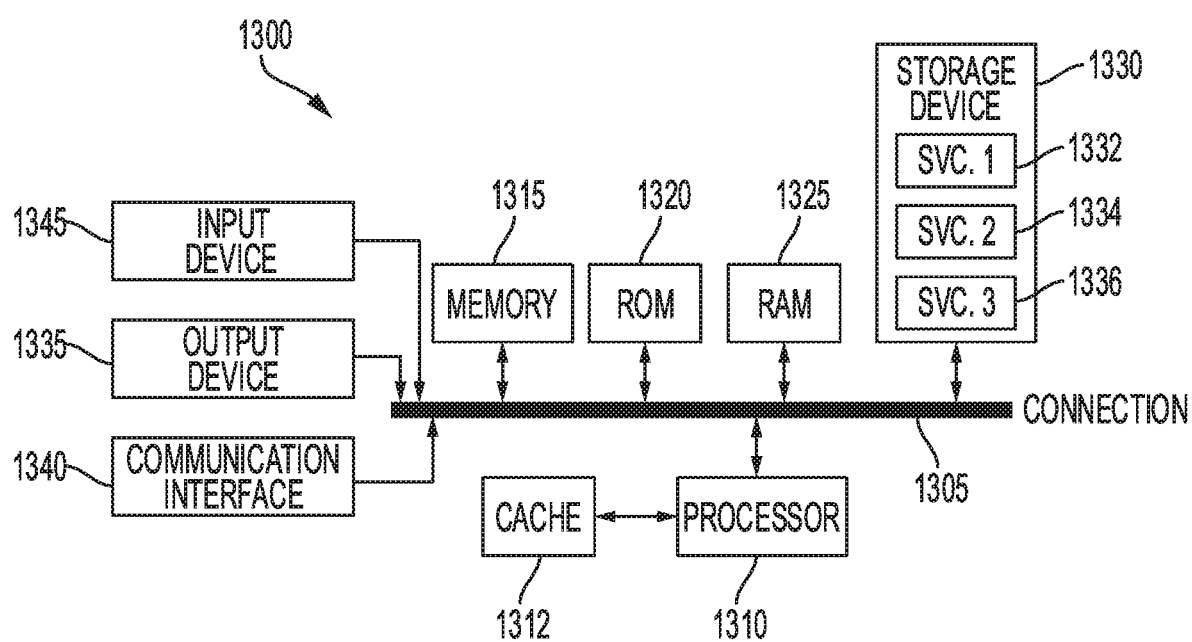
FIG. 13 is a schematic diagram of an example computing device architecture, in accordance with some examples.

As follows, the disclosure will provide a more detailed description of the systems, methods, computer-readable media and techniques herein for fast and accurate algorithms and technologies to simulate the response of bits used by rotary drilling systems. The disclosure will begin with a description of example systems and environments, as shown in FIGS. 1A through 11C, and a discussion of example algorithms and technologies for fast and accurate algorithms and calculations to simulate the response of bits used by rotary drilling systems. A description of example methods and techniques for fast and accurate algorithms and calculations to simulate the response of bits, as shown in FIG. 12, will then follow. The disclosure concludes with a description of an example computing system architecture, as shown in FIG. 13, which can be implemented for performing computing operations and functions disclosed herein. These variations shall be described herein as the various embodiments are set forth.

The disclosure now turns to FIG. 1A, which illustrates a schematic view of a logging while drilling (LWD) wellbore operating environment 100 in in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
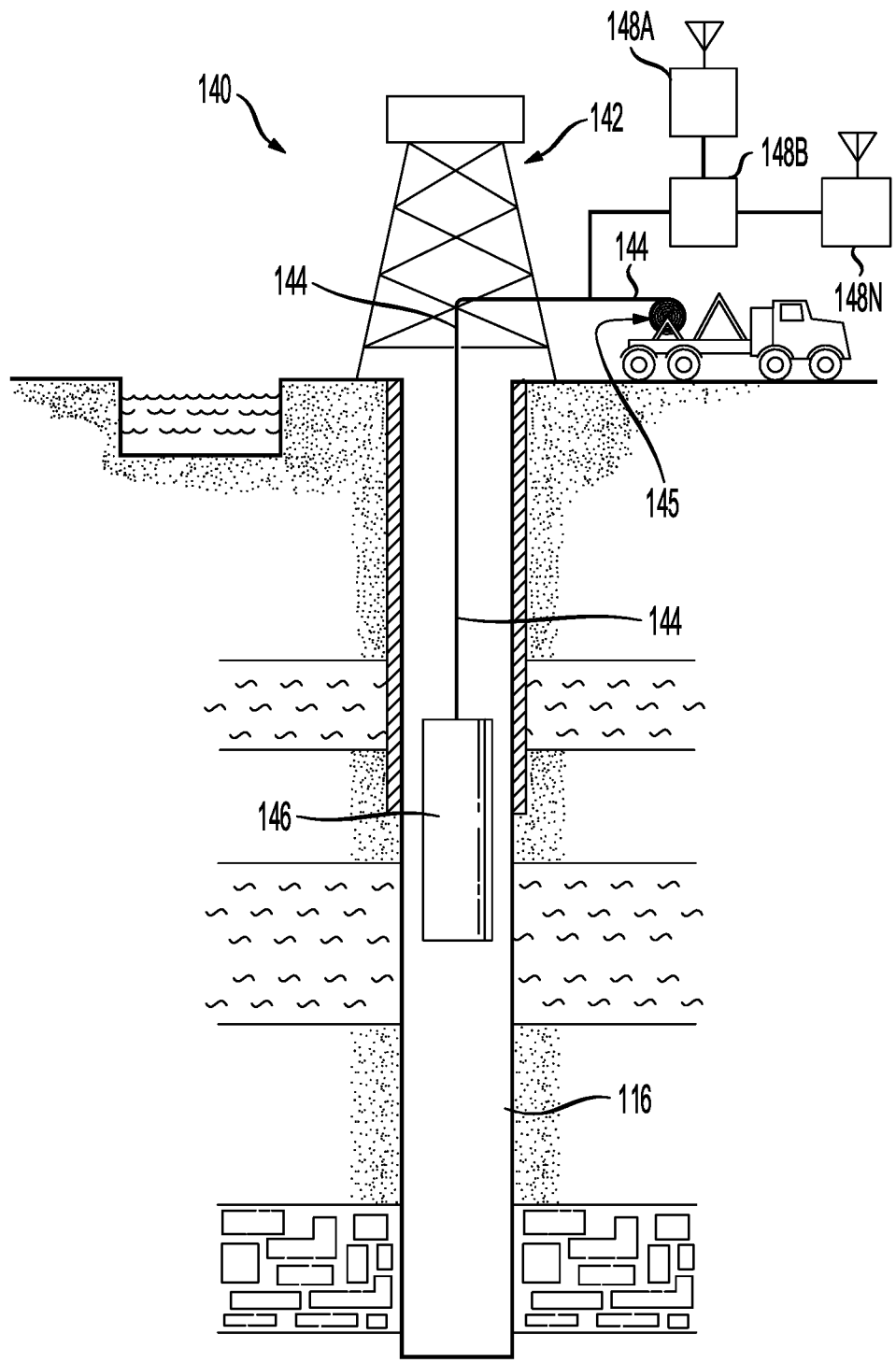
FIG. 1B is a schematic diagram of an example downhole environment having tubulars, in accordance with some examples.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
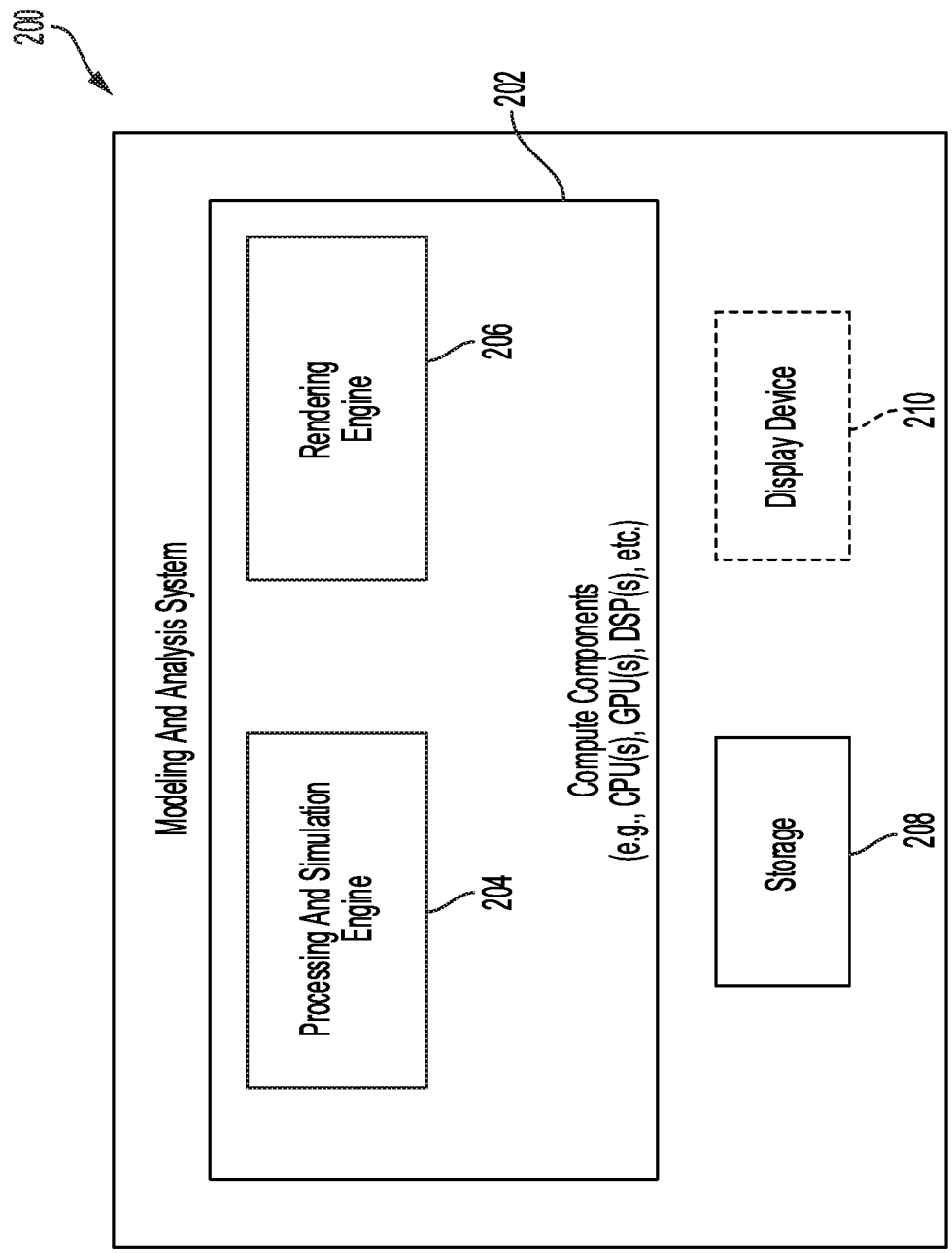
FIG. 2 is a block diagram of an example modeling and analysis system which can be implemented to analyze and simulate the response of bits in drilling system, in accordance with some examples.

FIG. 2 illustrates an example modeling and analysis system 200. The modeling and analysis system 200 can be implemented for simulating the response of bits in drilling systems as described herein. In this example, the modeling and analysis system 200 can include compute components 202, a processing and simulation engine 204, a rendering engine 206, and a storage 208. In some implementations, the modeling and analysis system 200 can also include a display device 210 for displaying data and graphical elements such as images, videos, text, simulations, and any other media or data content.

The modeling and analysis system 200 can be part of, or implemented by, one or more computing devices, such as one or more servers, one or more personal computers, one or more processors, one or more mobile devices (e.g., a smartphone, a camera, a laptop computer, a tablet computer, a smart device, etc.), and/or any other suitable electronic device. In some cases, the one or more computing devices that include or implement the modeling and analysis system 200 can include one or more hardware components such as, for example, one or more wireless transceivers, one or more input devices, one or more output devices (e.g., display device 210), one or more sensors (e.g., an image sensor, a temperature sensor, a pressure sensor, an altitude sensor, a proximity sensor, an inertial measurement unit, etc.), one or more storage devices (e.g., storage system 208), one or more processing devices (e.g., compute components 202), etc.

As previously mentioned, the modeling and analysis system 200 can include compute components 202. The compute components 202 can be used to implement the processing and simulation engine 204, the rendering engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The processing and simulation engine 204 can be used to process data, analyze data, model data, perform calculations, perform simulations, etc. For example, the processing and simulation engine 204 can be used to calculate the shape and size of the engagement surface on each cutter of a bit in a drilling system, the length and shape of the cutting edge, a force on the cutter at each time step. In some cases, the processing and simulation engine 204 can use geometric modeling techniques, such as polygon clipping, to calculate or model the bit design, the shape and size of the engagement surface on each cutter of the bit, the length and shape of the cutting edge, etc.

As another example, the processing and simulation engine 204 can be used to perform an adaptive time stepping algorithm corresponding to a constant increment of the angular position, to integrate the equations of motion for calculating or simulating a response of a bit. In some cases, the processing and simulation engine 204 can implement an angle-based algorithm to take advantage of the a priori known distribution of angular delays (e.g., as a function of the depth of cut).

The processing and simulation engine 204 can also analyze or process data and perform any of the algorithms and/or processing tasks/operations described herein, such as the algorithm for weight-on-bit and torque-on-bit, the algorithm for identifying cutter interaction, the adaptive time algorithm, the cutter projection calculations, the simulation calculations, etc., as further described herein.

The rendering engine 206 can generate and/or provide a graphical user interface (GUI) for receiving input data from a user and/or presenting data generated by the modeling and analysis system 200 (and/or any other computing device), such as simulations and calculation results from any of the calculations and algorithms described herein. In some examples, the rendering engine 206 can render data for presentation at the display device 210 and/or another display. The data rendered can include, for example, a simulation of a response of PDC bits, calculations, notifications, charts, tables, logs, lists, diagrams, reports, graphs, models or simulations, graphics, and/or any other data or content, such as video content, audio content, image content, text, file content, etc.

As previously noted, the rendering engine 206 can provide, display and/or render a GUI (and its associated content and interface elements) and/or content on the display device 210. In some cases, the display device 210 can be part of or implemented by the modeling and analysis system 200. Here, the rendering engine 206 can generate a GUI and/or rendered content, and provide the GUI and/or rendered content for presentation on the display device 210. In other cases, the display device 210 can be separate from the modeling and analysis system 200. For example, the display device 210 can be a separate and/or remote display. In this example, the modeling and analysis system 200 can send or provide a GUI and/or content generated by the rendering engine 206 (and/or the processing and simulation engine 204) to the display device 210 and/or a computing device implementing the display device 210, for presentation at the display device 210.

The storage 208 can be any storage device(s) for storing data. In some examples, the storage 208 can include a buffer or cache for storing data for processing by the compute components 202. Moreover, the storage 208 can store data from any of the components of the modeling and analysis system 200. For example, the storage 208 can store input data used by the modeling and analysis system 200, outputs or results generated by the modeling and analysis system 200 (e.g., data and/or calculations from the processing and simulation engine 204, the rendering engine 206, etc.), user preferences, parameters and configurations, data logs, documents, software, media items, GUI content, and/or any other data and content.

While the modeling and analysis system 200 is shown in FIG. 2 to include certain components, one of ordinary skill in the art will appreciate that the modeling and analysis system 200 can include more or fewer components than those shown in FIG. 2. For example, the modeling and analysis system 200 can also include one or more memory components (e.g., one or more RAMs, ROMs, caches, buffers, and/or the like), one or more input components, one or more output components, one or more processing devices, and/or one or more hardware components that are not shown in FIG. 2.

Figure 3:
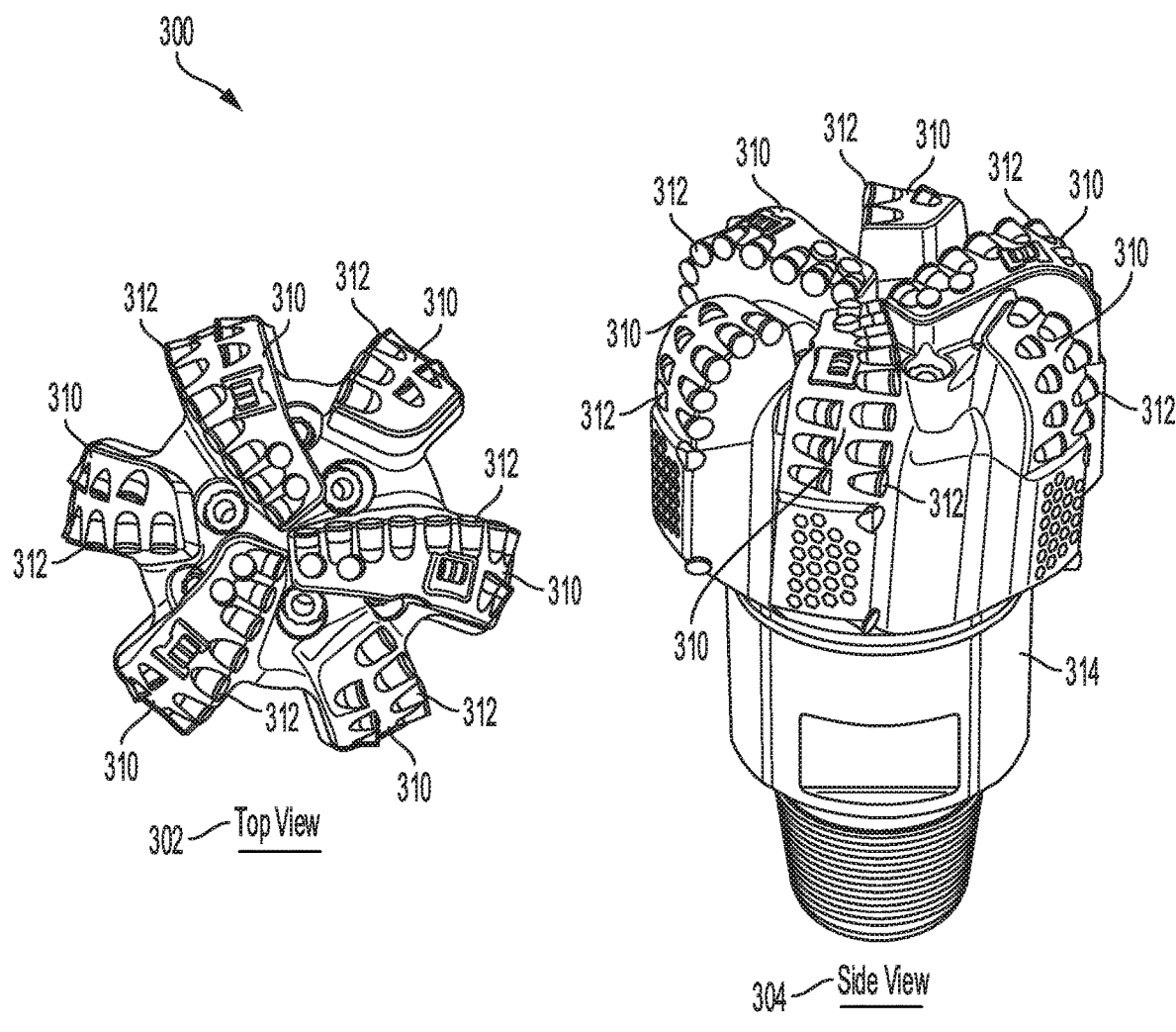
FIG. 3 is a top view and a side view of an example bit for a drilling system, in accordance with some examples.

FIG. 3 is a top view 302 and a side view 304 of an example bit 300 for a drilling system. The bit 300 can be used to drill, cut, scrape, crush, shear, etc., materials such as rock, formations (e.g., shale formations), and so forth. In some examples, the bit 300 can be situated on a bottom of a drill string (e.g., 108). The bit 300 can work by, for example and without limitation, scraping, cutting, shearing, and/or crushing the materials (e.g., rock) using force and/or a rotational motion.

In this example, the bit 300 can be a drag bit including a number of blades 310 mounted on, or coupled to, a bit body 314. Each of the blades 310 can include a number of cutters 312. In some implementations, the cutters 312 can be polycrystalline diamond compact (PDC) cutters. The bit 300 can use the blades 310 and cutters 312 to drill, cut, scrape, crush, shear, etc., materials such as rock and formations. The blades 310 and cutters 312 can apply force and/or motion, such as a rotational motion, to materials in order to scrape, cut, shear, drill, crush, etc., the materials.

As shown in FIG. 3, the bit 300 can have a complex arrangement of blades 310 and cutters 312, which can cause delays (e.g., motion or axial delays, angular delays, time delays, etc.) and a delay distribution that may depend on the penetration of the bit 300 per revolution. Moreover, the design (e.g., shape, size, length, configuration, etc.) of the bit 300 (and the blades 310 and cutters 312) can affect the stability of the motion of the bit 300 and the existence of a limit cycle corresponding to axial and/or torsional stick-slip oscillations.

Figure 4:
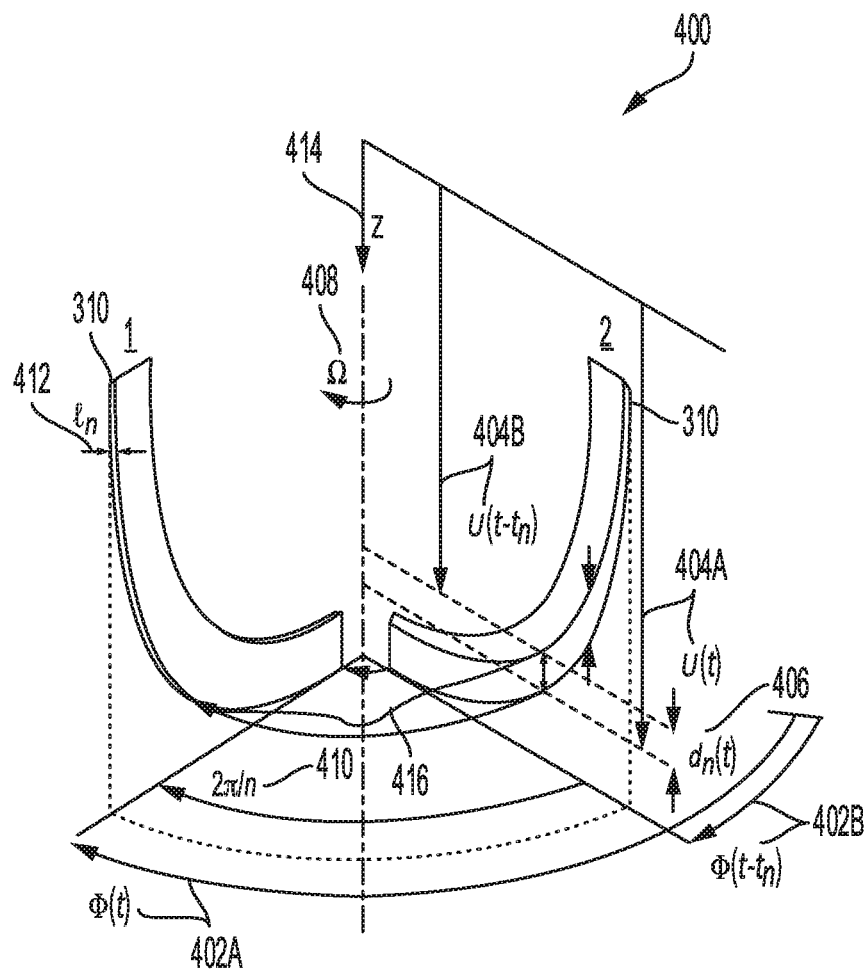
FIG. 4 is a diagram of an example idealized bit and depicts a regenerative effect and a section of a bottom-hole profile between two successive blades of the idealized bit, in accordance with some examples.

FIG. 4 is a diagram of an example idealized bit 400. The diagram depicts a section 416 of a bottom-hole profile between two successive blades 310 of the idealized bit 400 and a regenerative effect, which can result from stick-slip oscillations as described herein. In this example, $d_n$ represents the depth (406) of the cut of a cutting blade, U U represents the axial position (404A, 404B) of the bit, $\Phi$ represents the angular position (402A, 402B) of the bit, $\Omega$ represents the angular velocity (408) of the bit, $l_n$ represents the wearflat width (412) per blade, and Z represents an axis (414) of revolution of the bit. The Z-axis (414) can be parallel to the direction that the idealized bit 400 drills.

As shown in FIG. 4, for an idealized bit (400) having n number of symmetric blades distributed around an axis 414 of revolution and regularly spaced by an angle 410 of $2\pi/n$, the depth 406 of the cut of a cutting blade (e.g., ($d_n$), which describes the height or thickness of the rock ahead of the cutting blade (310), is the difference between the current axial bit position 404A (e.g., U (t)) and a past axial bit position 404B (e.g., U (t–$t_n$)) corresponding to the presence of a previous cutting blade at the current angular position 402A (e.g., $\Phi$(t)). Thus, any perturbation in the axial motion of the bit affects, with a time delay $t_n$ which can represent the time interval it takes the bit to rotate $2\pi/n$ rad (e.g., the angle 410 between two successive blades 310), the depth 406 of the cut (e.g., ($d_n$)) and thus the reaction force on the idealized bit 400. Moreover, due to the regenerative effect at the bit or rock interface, the reaction weight and torque on the bit can depend on the motion history of the bit (e.g., U (t), U (t–$t_n$), $\Phi$(t), $\Phi$(t–$t_n$), $\Omega$, etc.).

Under certain conditions, the delayed feedback can cause a growth of the perturbation and a loss of the system's stability, which eventually leads to stick-slip axial and/or torsional oscillations. For an idealized bit (400) characterized by a single angular delay (e.g., the constant angle $\Phi$ between two blades 310), the system can become unstable when a rotational speed (e.g., $\Omega$) and number of blades are below a threshold. Moreover, the stability of the motion and the existence of a limit cycle corresponding to torsional stick-slip oscillations depend on the bit design.

Thus, for greater accuracy, when assessing the stability of a particular bit design through numerical simulations, the actual cutter layout can be accounted in the calculations. However, the actual cutter layout can be difficult to estimate and/or incorporate. As previously shown in FIG. 3, PDC bits have a complex arrangement of cutters (312), which are responsible for delays and a delay distribution that can depend on the bit penetration per revolution.

To incorporate a realistic bit geometry in the calculations and/or simulations herein, the angular delays and relative heights between cutters (312) can be taken into account. Angular delays introduce time delays in the associated equations of motion, while relative heights result in a dependence of angular delays on the bit motion. Moreover, time delays are not known a priori, as they are computed by inverting the motion history of the bit. Furthermore, the complex cutter layout on the bit implies that the cross-section of the groove traced by any cutter (referred to as the engagement surface) has a complicated time-dependent shape. Also, the geometry of the engagement surface is related to the forces acting on the cutter. Thus, the forces on the cutters can be integrated in the equations of motion to, among other things, account for the geometry of the engagement surface.

Given the existence of time delays, the process of calculating the forces acting on each cutter, and the implementation of small time steps (e.g., corresponding to a large number of time steps of order O ($10^3$~$10^4$) for each revolution of the bit), the bit and/or engagement surface geometry calculations can be very compute-intensive. However, the approaches herein can implement various techniques to accelerate calculations, thus saving time, cost, resources, and so forth.

In some examples, geometric modeling techniques, such as polygon clipping, can be used to calculate the shape and size of the engagement surface on each cutter and the length and shape of the cutting edge. Such techniques, as described and implemented herein, can enable fast and accurate calculation of the engagement surface and cutting edge, and consequently the force on the cutter at each time step. Moreover, in some examples, an adaptive time stepping corresponding to a constant increment of the angular position of the bit can be integrated into the equations of motion. The angle-based algorithm can take advantage of the a priori known distribution of angular delays to determine the active engagement surface for each cutter. The compute-intensive search of the time delay can thus be reduced to an indexing problem.

In some aspects, an algorithm implemented for calculating weight-on-bit (WOB) and torque-on-bit (TOB) can include various components. In one aspect, the algorithm can identify the potential cutter interaction and approximate the cutter projection on a reference plane by a polygon. This can be conducted once for a given bit design. In another aspect, the algorithm can implement a set of tasks to be carried out at each time step to compute WOB and TOB. In these calculations, the motion of the bit can be described by the bit's angular position $\Phi$(t) and axial position U (t).

1. Identifying Cutter Interaction

The algorithm to identify the potential cutter interaction can include (A) determining a bit profile, (B) determining a cutter interaction table, and (C) polygon discretization of cutter geometry.

A. Determining Bit Profile

To determine the bit profile, two sets of coordinates are first introduced. One set of coordinates is fixed in space ("Eulerian"), while the other set of coordinates is attached to the bit ("Lagrangian"). The Eulerian reference system can be introduced as a Cartesian coordinates system (x, y, z) with the z-axis corresponding to the bit axis and pointing in the direction of axial bit advance, or as a cylindrical coordinates system (r, $\theta$, z), with $r=\sqrt{x^2+y^2}$ and $\theta$=arctan (y/x). The Lagrangian reference system attached to the bit can be defined as a Cartesian coordinates system (X, Y, Z) or a cylindrical coordinate system (R, $\Theta$, Z), with $R=\sqrt{X^2+Y^2}$ and $\Theta$=arctan (Y/X), with $\Theta \in$ (0, $2\pi$). The origin of the Lagrangian reference system can be located at an arbitrary point on the bit axis of revolution. In some cases, since the borehole can be assumed to be straight, axes z and Z can be coaxial.

Figure 5A:
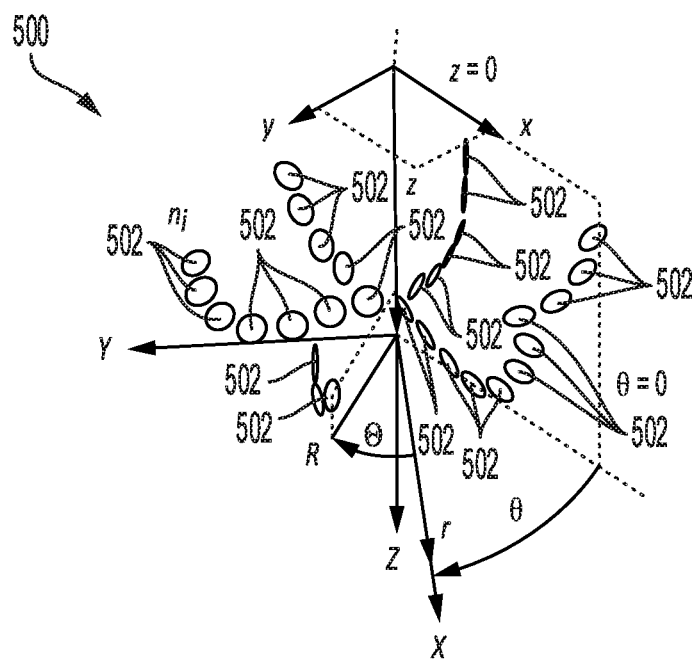
FIG. 5A is a representation of example cutter faces in a Eulerian coordinate system and a Lagrangian coordinate system, in accordance with some examples.

FIG. 5A illustrates a representation 500 of cutter faces 502 in the Eulerian coordinate system ((x, y, z), (r, $\theta$, z)) and the Lagrangian coordinate system (X, Y, Z). The cutter layout can be represented as a collection of (generally) circular faces (e.g., cutter faces 502). Moreover, the Eulerian and Lagrangian coordinate systems can be used to depict the bit (e.g., 300) and the motion of the cutter (e.g., 312). The origin of the coordinate system (X, Y, Z) can coincide with the origin of the coordinate system (x, y, z) at time t=0. The bit motion in a fixed cylindrical coordinate system is described by the axial positions U (t) and the angular positions $\Phi$(t) of the bit. The position of the bit radial line $\Theta$=0, Z=0 in the fixed cylindrical coordinate system can be described by:

$$\Theta = \Phi(t) \quad z = U(t) \quad \text{Equation (1)}.$$

Index i can be used to denote the i-th PDC insert on the bit (e.g., i=1, 2, ..., N, with N denoting the total number of cutters). The cutters (312) can be numbered in an ascending order with increasing radial distance between cutter center and the bit axis of rotation. The coordinates of the i-th cutter center in the bit cylindrical coordinate system can be defined as ($R_i$, $\Theta_i$, $Z_i$). The cutter position in the fixed (Eulerian) coordinate system can be given by ($R_i$, $\Phi_i(t)$, $U_i(t)$), where:

$$\Phi_i(t)=\Phi(t)+\Theta_i \quad U_i(t)=U(t)+Z_i \qquad \text{Equation (2)}.$$

Other quantities can also be implemented for this task. For example, the cutter face orientation $n_i$, which forms an acute angle with the tangential velocity due to bit rotation as shown in FIG. 5A, and the cutter radius $\alpha_i$ can also be implemented for this task.

Figure 5B:
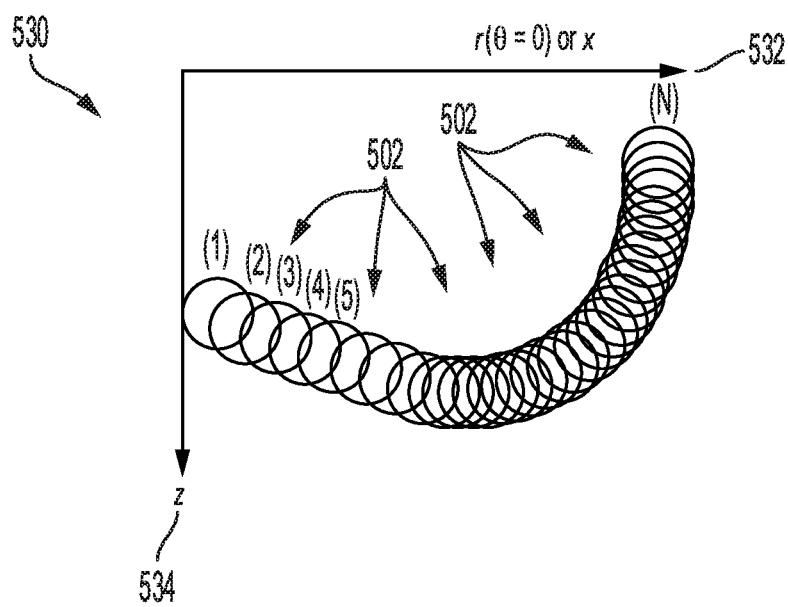
FIG. 5B is a representation of an example bit profile, in accordance with some examples.

With reference to FIG. 5B, which illustrates a bit profile 530, the bit can then be rotated without axial advance and the face 502 of each cutter (312) can be projected onto a half-plane with an x-axis 532 and z-axis 534 corresponding to y=0, z>0 (or r>0, θ=0), when its center crosses the half-plane. The resulting projection in the half-plane (x, z) can be the bit profile 530, which includes a collection of projections of cutter faces 502. A cutter numbering can also be shown in the bit profile 530. Additional examples and details for projecting cutter faces are described below with reference to FIGS. 11A and 11B.

B. Determining Cutter Interaction Table

As discussed below, calculation of the engagement surface $S_i$ of cutter $C_i$ (i=1, ..., N)—the cross-section of the groove traced by cutter $C_i$—depends on the past positions of the cutters that are interacting with $C_i$. To calculate $S_i$ efficiently, the algorithm can identify the cutters that could interact with $C_i$ $C_i$ (i=1, ..., N). This can be done by defining the index set $I_i$, which contains the cutter numbers of the cutters $C_j$ that are potentially interacting with $C_i$. In other words, during drilling, cutter $C_i$ may potentially cut a rock surface created by cutters $C_j$, $j \in I_i$.

The index set $I_i$ (i=1, ..., N) can be determined by constructing an N×N cutter interaction matrix P, with $P_{ij}=1$ indicating a potential interaction between $C_i$ and $C_j$ and $P_{ij}=0$ meaning no interaction. $P_{ij}=1$ if $C_j$ is radially overlapping with $C_i$ in the bit profile, hence:

$$P_{ij} = \begin{cases} 0, & \overline{R}_j < \underline{R}_i \text{ or } \underline{R}_j > \overline{R}_i \\ 1, & \text{otherwise} \end{cases}, \qquad \text{Equation (3)}$$

with [$\underline{R}_i$, $\overline{R}_i$] ($\overline{R}_i > \underline{R}_i$) giving the radial range of a cutter $C_i$ in the bit profile.

Figure 6:
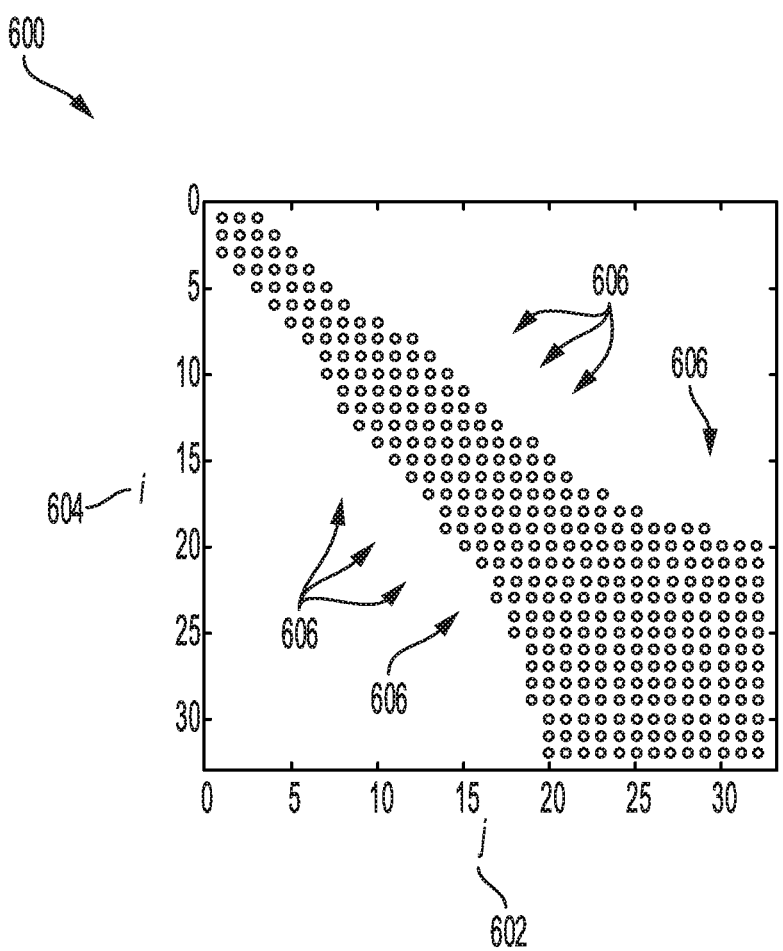
FIG. 6 is a chart depicting a cutter interaction matrix for determining potential interactions between cutters, in accordance with some examples.

FIG. 6 is a chart 600 plotting the non-zero entries 606 of the cutter interaction matrix P along an axis 602 associated with cutter $C_j$ and an axis 604 associated with cutter $C_i$. The matrix P can be symmetric (e.g., $P_{ij}=P_{ji}$), as an interaction of cutter $C_i$ with cutter $C_j$, implies that cutter $C_j$ interacts with cutter $C_i$. Moreover, the non-zero entries 606 of the cutter interaction matrix P depict the potential interactions between cutter $C_i$ and cutter $C_j$.

The index set $I_i$ is then deduced from the cutter interaction matrix P. For example, the set $I_i$ for cutter $C_{1,j}$ of the PDC bit 300 is given by $I_j=\{1, 2, 3\}$. The angular offsets $\Phi_{ji}$, defined by the angle by which cutter $C_j$, $j \in I_i$ is ahead of $C_i$, can then be deduced from the cutter layout as follows:

$$\Phi_{ji} = \begin{cases} \Phi_j - \Phi_i, & \Phi_j \geq \Phi_i \\ 2\pi + \Phi_j - \Phi_i, & \Phi_j < \Phi_i \end{cases}, \qquad \text{Equation (4)}$$

where $\Phi_i$ and $\Phi_j$ represent the angular position of cutter centers during bit motion as in Equation (2), and the time-dependent term $\Phi(t)$ is canceled in the above formulation. In other words, $\Phi_{ji}$ reflects the cutter layout, and $\Phi_{ji} \in [0, 2\pi]$.

C. Polygon Discretization of Cutter Geometry

The engagement surface for each cutter $S_i$ (i=1, ..., N) can be determined by calculating the intersection of surfaces. In some examples, this operation can be done efficiently using "polygon clipping" when the boundary of the cutter projection on the (r, z) plane is discretized by a polygon with K nodes.

The projection of a cutter on the (r, z) plane can be affected by the bit motion. However, in some cases, corrections for the bit motion can be generally negligible. Thus, in some cases, the projection of any cutter can be assumed to be identical to the one in the bit profile irrespective of bit motion. This assumption, while optional, can accelerate the calculations since the polygon approximation of the cutter geometry is not affected by the bit motion.

As described herein, the Cartesian coordinates of the k-th node (k=1, 2, ..., K) of the polygon describing cutter i can readily be translated into the nodal coordinates ($r_{i,k}, z_{i,k}$) on the cutter projection plane. The nodal coordinates ($r_{i,k}, z_{i,k}$) can be concatenated into a matrix with two column vectors $[\vec{r}_i]_{K \times 1}$, $[\vec{z}_i]_{K \times 1}$ and K rows, containing the coordinates in the projection plane of the nodes of the polygon describing cutter $C_i$, which can be denoted collectively by $B_i$ as follows:

$$B_i = [\vec{r}_i \vec{z}_i]_{K \times 2} \qquad \text{Equation (5)}.$$

This matrix $B_i$ is a polygonal representation of cutter C, in the projection plane.

2. Calculating Weight-On-Bit and Torque-On-Bit

Figure 7A:
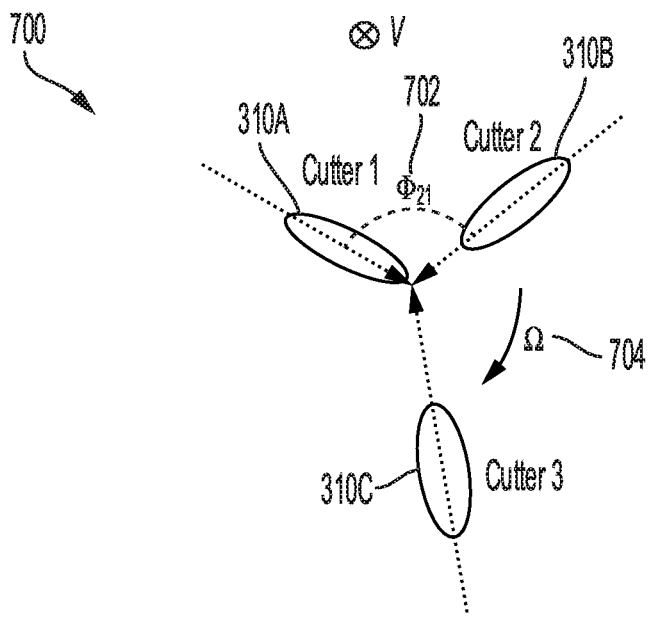
FIG. 7A is a diagram depicting the angle between two successive cutters of a bit and the angular velocity between two successive cutters of the bit, in accordance with some examples.
Figure 7B:
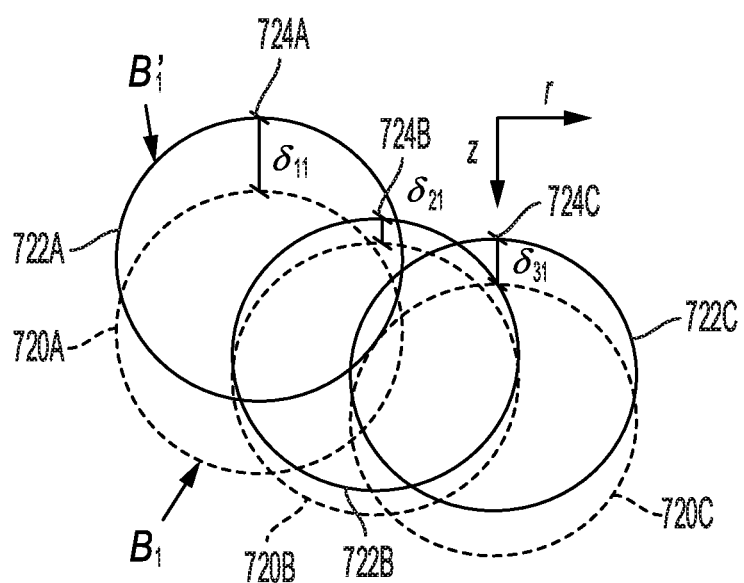
FIG. 7B is a view of example cutter face projections and example shifted cutter face projections associated with the cutters shown in FIG. 7A, in accordance with some examples.
Figure 7C:
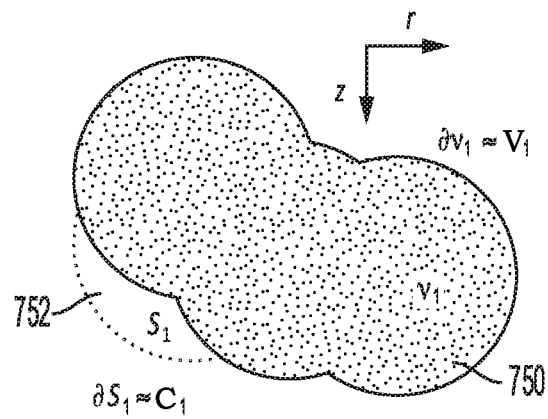
FIG. 7C is a view of an example void surface calculated based on the example shifted cutter face projections shown in FIG. 7B and an example cutter/rock engagement surface calculated for the cutters shown in FIG. 7A, in accordance with some examples.
Figure 7D:
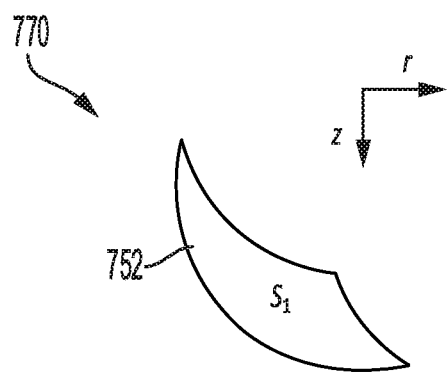
FIG. 7D is a view of an example cutter engagement shape calculated based on the cutter/rock engagement surface shown in FIG. 7C, in accordance with some examples.

The algorithm for calculating the reaction weight-on-bit and torque-on-bit is described below. In some aspects, the algorithm can include calculating cutter engagement surfaces. FIGS. 7A-D illustrate diagrams for determining the engagement surface of a cutter of interest (e.g., cutter $C_{1,j}$) for a PDC bit 300. With reference to FIG. 7A, a diagram 700 illustrates the angle 702 ($\Phi_{21}$) between successive cutters 310A and 310B of the bit 300, and the angular velocity 704 ($\Omega$) between successive cutters 310B and 310C of the bit 300. Recall that U (t) and $\Phi(t)$ denote the axial and angular position of the bit 300 and $\Phi_{ji}$ in Equation (4) denotes the angle between cutters $C_i$ and $C_j$ (e.g., between the two cutter centers). The calculation of cutter engagement surfaces and shapes, as shown in FIGS. 7B-D and described below, and the computation of weight-on-bit and torque-on-bit, as described below, are repeated for each time step as the cutter engagement surfaces $S_i$, i=1, ..., N vary with time if the bit motion is not uniform.

A. Calculating Cutter Engagement Surfaces

The engagement surface $S_i$ of cutter $C_i$ depends on past axial positions of cutters $C_j$, $j \in I_i$, when they were previously at the current angular position of $C_i$. In some examples, $S_i$ can be calculated as follows.

The first task can include shifting $B_j = (\vec{r}_j, \vec{z}_j)$, $j \in I_i$ along z to get $B_j'$ as follows:

$$B_j' = B_j - \Delta_{ji}, j \in I_i \qquad \text{Equation (6)}$$

The matrix $\Delta_{ji}$, matching the dimension of $B_j$ is defined as follows:

$$\Delta_{ji} = \delta_{ji'} [0_{K \times 1} 1_{K \times 1}]_{K \times 2} \quad \text{Equation (7)}.$$

The current angular and axial positions of the bit can be denoted as $\Phi$ and U. The shifted amount $\delta_{ji}$ is the axial bit advance when the bit rotates from $\Phi - \Phi_{ji}$ to $\Phi$, and the time delay reads $t_{ji}$. This is represented in the following equation:

$$\delta_{ji} = U(t) - U(t - t_{ji}) \quad \Phi_{ji} = \Phi(t) - \Phi(t - t_{ji}) \quad \text{Equation (8)}.$$

FIG. 7B shows example cutter face projections 720A-C (e.g., $B_j$, j=1, 2, 3) and shifted cutter face projections 722A-C (e.g., $B_j'$, j=1, 2, 3). The shifted cutter face projections 722A-C are shifted by certain differences 724A-C representing the amount of advance of the bit (300) when the bit rotates. In some examples, when the bit rotates, the angle difference of cutter $C_i$ can be $2\pi$. Thus, in some cases, the shifted cutter face projections 722A-C can be shifted by an axial bit advance distance related to $2\pi$.

In some aspects, projections of cutters (e.g., 720A-C, 722A-C) can be approximated using polygons. For example, the polygon $V_i$ can be determined by all $B_j'$ using a Boolean set operation of union. The polygon $V_i$ can approximate the boundary of the void surface $\mathcal{V}_i$ (e.g., the surface of the rock removed that relates to cutter $C_i$). Part of the boundary of $\mathcal{V}_i$ represents the rock surface seen by cutter $C_i$.

FIG. 7C illustrates the void surface 750 associated with the shifted cutter face projections 722A-C (e.g., $B_j'$, j=1, 2, 3) and a cutter/rock engagement surface 752 ($S_1$) calculated for the cutters (e.g., 310A, 310B, 310C) associated with the cutter face projections (720A-C, 722A-C). The void surface 750 represents $\mathcal{V}_i$ (bounded by polygon $V_1$) and has the shape of the union of the ellipses corresponding to the shifted cutter face projections 722A-C (e.g., $B_j'$, j=1, 2, 3). The void surface 750 ($\mathcal{V}_i$) depicts the total area removed within one revolution by the cutters (e.g., 310A, 310B, 310C) associated with the shifted cutter face projections 722A-C (e.g., $B_j'$, j=1,2,3).

Taking a Boolean set difference between $B_i$ and $V_i$ can be used to obtain the polygon $C_i$, which approximates the boundary of the cutter/rock engagement surface 752 ($S_1$). FIG. 7D illustrates the resulting shape 770 of the cutter/rock engagement surface 752 ($S_1$). In this example, the resulting shape 770 is a crescent shape corresponding to the non-overlapping area between cutter face projection 720A and shifted cutter face projections 722A-C.

B. Calculating Weight-on-Bit and Torque-on-Bit

To calculate weight-on-cutter (WOC) and torque-on-cutter (TOC), certain geometric parameters for $S_i$ can be used. A constant contact stress $\sigma$ can be assumed to exist on the wearflat of each cutter (perpendicular to the cutter/rock contact surface), when the cutter is engaging the rock. The cutting edge $\Gamma_i$ can be defined as the partial boundary of $S_i$ where $\sigma$ exists, and can correspond to a radial range of $S_i$. Formally, $\Gamma_i$ can be a collection of points $\{\mathcal{P}\}$ such that:

$$\begin{cases} \mathcal{P} \in \check{\Gamma}i \\ -\vec{e}_V \cdot \vec{n}_\mathcal{P} > 0 \end{cases}, \quad \text{Equation (9)}$$

where $\check{\Gamma}_i$ is the lower boundary arc of $S_i$, the boundary of $S_i$ that belongs to $C_i$; unit vector $\vec{n}\mathcal{P}$, is the inward normal of $\check{\Gamma}_i$ at $\mathcal{P}$ representing the direction of the contact force; and $\vec{e}_V$ is the direction of axial bit motion.

Figure 8:
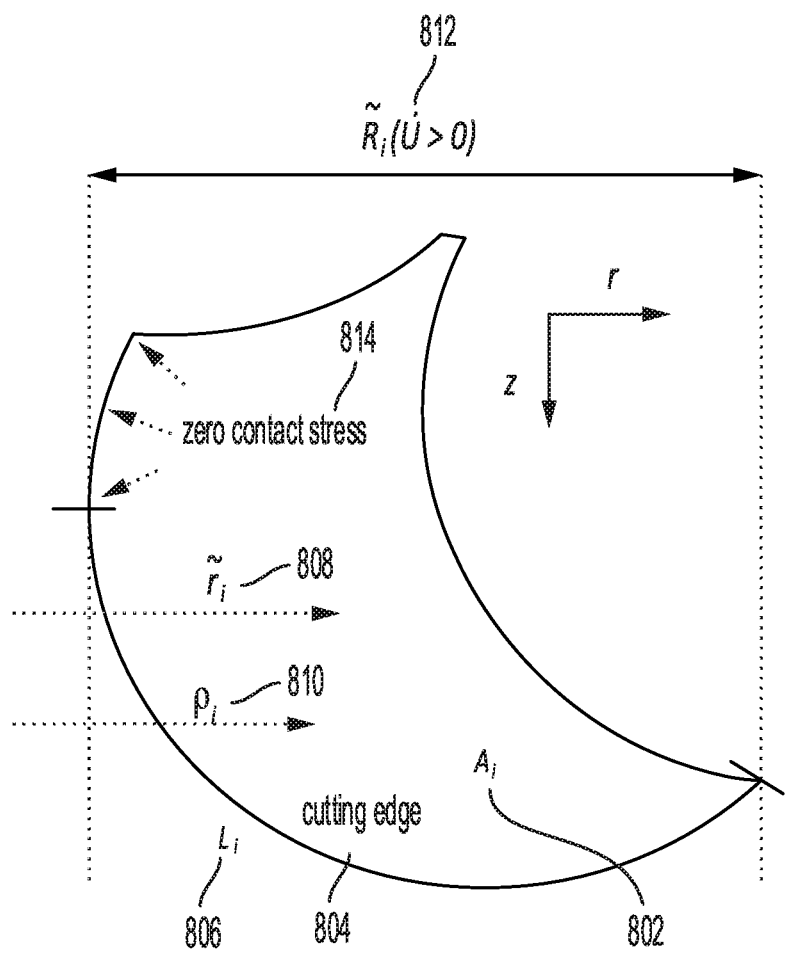
FIG. 8 is a diagram of an example cutter engagement shape and associated geometric parameters which can be used to calculate weight-on-cutter (WOC) and torque-on-cutter (TOC), in accordance with some examples.

FIG. 8 illustrates example geometric parameters for $S_i$ (approximated by polygon $C_i$) which can be used to calculate weight-on-cutter (WOC) and torque-on-cutter (TOC). In this example, the geometric parameters include the cut area 802 ($A_i$) of $S_i$, the distance 808 ($\tilde{r}_i$) from the axis of rotation to the centroid of $S_i$, the arc length 806 ($L_i$) of the cutting edge, the radial length 812 ($\tilde{R}_i$) of the cutting edge, and the distance 810 ($\rho_i$) from the axis of rotation to the centroid of $\Gamma_i$.

In some cases, the following additional parameters (which can be assumed to be identical for all cutters) can also be implemented: the intrinsic specific energy $\varepsilon$ (i.e., the amount of energy spent to cut a unit volume of rock), the ratio between vertical and horizontal cutting forces $\zeta$, the ratio between horizontal and vertical contact forces $\mu$, and the wearflat width $l$.

Thus, the contributions of cutter $C_i$ to the cutting and contact components of the torque and weight-on-bit can be given by:

$$W_{ci} = \varepsilon \zeta A_i \quad T_{ci} = \varepsilon A_i \tilde{r}_i \quad W_{fi} \in \sigma l Y \tilde{R}_i \quad T_{fi} \in \mu \sigma l Y L_i \rho_i \quad \text{Equation (10)}.$$

In which Y is a set-value function and its value depends on the sign of axial velocity as follows:

$$Y \in \begin{cases} 1 & \mathcal{U} > 0 \\ (0, 1) & \mathcal{U} = 0 \\ 0 & \mathcal{U} < 0 \end{cases}. \quad \text{Equation (11)}$$

When axial velocity vanishes ($\mathcal{U} = 0$), both the weight-on-bit and torque-on-bit related to the contact force can be solved according to the equilibrium condition, as Y can take any values within (0, 1). The weight-on-bit and torque-on-bit can then be as follows:

$$W \in \Sigma_i (\varepsilon \zeta A_i + \sigma l Y \tilde{R}_i) T \in \Sigma_i (\varepsilon A_i \tilde{r}_i + \mu \sigma l Y L_i \rho_i) \quad \text{Equation (12)}.$$

3. Adaptive Time Algorithm

An adaptive time algorithm can be used to calculate the transient response of the rotary drilling system based on advancing in time so as to progress with a constant angle increment at the bit. For simplicity, the algorithm is presented for the case of the idealized bit in FIG. 4. This bit includes of n number of symmetric blades and is thus characterized by a single angular delay $2\pi/n$. However, the algorithm can readily be generalized to handle other bit designs, such as the realistic bit design (300) shown in FIG. 3.

The governing equations of motion for a perturbation of the steady-state response of a single degree-of-freedom (DOF) drilling system can include:

$$\ddot{\mu} = \psi(W_0 - W) \quad \text{Equation (13)},$$

$$\ddot{\varphi} + \varphi = \mathcal{T}_0 - \mathcal{T} \quad \text{Equation (14)},$$

where u and $\varphi$ represent the perturbation of the axial and angular displacements of the bit with respect to the steady-state drilling case, and the variables ($\ddot{\mu}$, $\ddot{\varphi}$) refer to the corresponding accelerations (with respect to non-dimensional time $\tau$).

Moreover, $W - W_0$ and $\mathcal{T} - \mathcal{T}_0$ are the perturbed weight-on-bit (WOB) and torque-on-bit (TOB), respectively, and can be expressed as:

$$W - W_0 = \delta + g(\dot{u})$$

$$\mathcal{T} - \mathcal{T}_0 = \delta + \beta g(\dot{u}),$$

where $\hat{\delta}$ is the perturbed depth of cut, which is obtained from the instantaneous depth of cut ($\delta$) as $\delta=\delta_0+\hat{\delta}=2\pi\alpha_0+n[(u-\tilde{u})-\alpha_0(\varphi-\tilde{\varphi})]$.

Here, $\tilde{u}$ and $\tilde{\varphi}$ are the values of the axial and angular perturbations at a prior time instant ($\tilde{\tau}$), and $g(\dot{u})$ is a set-valued function that models the frictional component of the bit-rock interaction, and can be defined as $$g(\dot{u}) = \frac{\lambda}{2}(1 - \text{sgn}(\dot{u} + v_0)),$$

where $\lambda$ is the bluntness parameter that encapsulates the contact pressure at the wearflat-rock interface.

In addition, n represents the number of blades in the idealized drag bit, while $\psi$ and $\beta$ are system parameters, and $\alpha_0$ is the ratio of rate-of-penetration ($v_0$) to the angular velocity ($\omega_0$) imposed at the top end.

A. Numerical Simulation

Numerical simulations of the system of Equation (13) and Equation (14) can be carried out by employing a state space model illustrated below:

$$\dot{x}=f(\tau,x,\tilde{x}) \quad \text{Equation (15)},$$

where the state vector x, and the time derivative f are given as:

$$x = \begin{Bmatrix} u \\ \dot{u} \\ \varphi \\ \dot{\varphi} \end{Bmatrix},$$

$$f = \begin{Bmatrix} \dot{u} \\ n\psi[(\tilde{u}-u)-\alpha_0(\tilde{\varphi}-\varphi)+g(\dot{u})] \\ \dot{\varphi} \\ n[(\tilde{u}-u)-\alpha_0(\tilde{\varphi}-\varphi)+\beta g(\dot{u})]-\varphi \end{Bmatrix}$$

To benchmark the numerical simulations, the following time-stepping algorithms belonging to the family of explicit Runge-Kutta methods (RK2 (second order)) and RK4 (fourth order) can be implemented:

$$x_{p+1}=x_p+d\tau\Sigma_{i=1}^{s}b_ik_i \quad \text{Equation (16),}$$

$$k_i=f(\tau_p+c_id\tau,x_p+d\tau\Sigma_{j=1}^{i-1}a_{ij}k_j,\tilde{x}_{p+ci}) \quad \text{Equation (17)},$$

where s is the number of stages, and $\tilde{x}_{p+ci}$ is the delayed state vector corresponding to each intermediate function evaluation.

Figure 14:
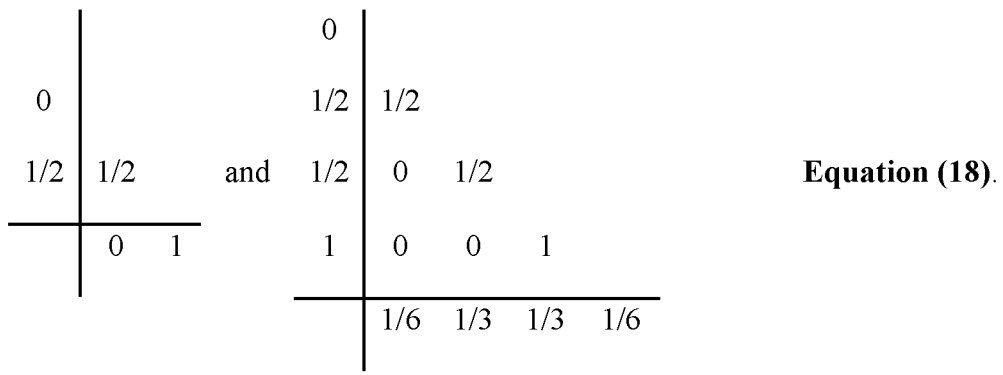
FIG. 14 is a representation of a Butcher tableau.

The coefficients $a_{ij}$, $b_i$, $c_i$ can be provided using the Butcher tableau, as shown in FIG. 14.

I. Evaluating Time-Delay and Associated Parameters

In the numerical simulation, given an array of time instances $\tau(=[\tau_{start}:\partial\tau:\tau_{end}])$, the state variables ($\dot{u}$, u, $\dot{\varphi}$, $\varphi$) can be determined using the time-stepping algorithm. At any time instant $\tau_p$, the time delay $\tau_{\tilde{p}}$ can be represented as the time taken by the blade to rotate through an angle $$\frac{2\pi}{n},$$

which can be given by $$\Phi(\tau_p)-\Phi(\tau_{\tilde{p}}) = \frac{2\pi}{n},$$

where $\Phi$ corresponds to the array of total angular displacement ($\Phi=\omega_0\tau+\varphi:[\Phi_1, \Phi_2, \ldots]$).

In the numerical scheme, this time delay can be determined by a linear search as $$\Phi_{\tilde{p}} < \Phi(\tau_p) - \frac{2\pi}{n} < \Phi_{\tilde{p}+1},$$

where $\tilde{p}$ is the index in the array such that $\Phi(\tau_{\tilde{p}})$ is contained in the interval $[\Phi_{\tilde{p}}, \Phi_{\tilde{p}+1}]$. Once the index $\tilde{p}$ is determined, the corresponding delayed variables $\tilde{u}$ and $\tilde{\varphi}$ can be obtained from the time history of axial and angular displacements.

II. Modified RK2 Scheme

The search of the angular displacement array to determine the time delay can be a computationally laborious procedure, and can be a bottleneck in simulating the transient dynamics. However, the approaches herein can simplify and/or reduce the number of time delay estimates without compromising on the accuracy of the numerical scheme. For example, in some cases, the second order method (RK2) can be used. The second order method (RK2) can be expressed as $x_{p+1}=x_p+d\tau f(\tau_p+\frac{1}{2}d\tau,x_p+\frac{1}{2}d\tau f(\tau_p, x_p))$.

Moreover, the following can be obtained by expanding the state space vector into its constituents as described in the following equations:

$$u_{p+1} = \dot{u}_{p+1/2}d\tau = u_p + \dot{u}_p d\tau + \frac{1}{2}\ddot{u}_p d\tau^2 \quad \text{Equation (19)}$$

$$\dot{u}_{p+1} = \dot{u}_p + \ddot{u}_{p+\frac{1}{2}}d\tau = \dot{u}_p + n\psi d\tau[(\tilde{u}_{p+1/2} - u_{p+1/2}) - \alpha_0$$
$$(\tilde{\varphi}_{p+1/2} - \varphi_{p+1/2}) + g(\dot{u}_{p+1/2})]$$

$$\varphi_{p+1} = \varphi_p + \dot{\varphi}_{p+1/2}d\tau = \varphi_p + \dot{\varphi}_p d\tau + \frac{1}{2}\ddot{\varphi}_p d\tau^2$$

$$\dot{\varphi}_{p+1} = \dot{\varphi}_p + \ddot{\varphi}_{p+\frac{1}{2}}d\tau = \dot{\varphi}_p + nd\tau\left[\left(\tilde{u}_{p+\frac{1}{2}} - u_{p+\frac{1}{2}}\right) - \alpha_0\right.$$
$$\left.\left(\tilde{\varphi}_{p+\frac{1}{2}} - \varphi_{p+\frac{1}{2}}\right) + g(\dot{u}_{p+\frac{1}{2}})\right] - \varphi_{p+1/2}.$$

From the above calculations, it can be seen that the additional function evaluation at the midpoint (p+½) affects only the velocities and not the displacements. Therefore, under the assumption of a small time step (d$\tau$), the mid-point evaluation can be neglected, which results in the modified RK2 scheme (RK2M):

$$\dot{u}_{p+1}=\dot{u}_p+\ddot{u}_p d\tau=\dot{u}_p+n\psi d\tau[(\tilde{u}_p-u_p)-\alpha_0(\tilde{\varphi}_p-\varphi_p)+g(\dot{u}_p)]$$

$$u_{p+1}=u_p+\frac{1}{2}(\dot{u}_p+\dot{u}_{p+1})d\tau=u_p+\dot{u}_p d\tau+\frac{1}{2}\ddot{u}_p d\tau^2$$

$$\dot{\varphi}_{p+1}=\dot{\varphi}_p+\ddot{\varphi}_p d\tau=\dot{\varphi}_p+nd\tau[(\tilde{u}_p-u_p)-\alpha_0(\tilde{\varphi}_p-\varphi_p)+g(\dot{u}_p)-\varphi_p]$$

$$\varphi_{p+1}=\varphi_p+\frac{1}{2}(\dot{\varphi}_p+\dot{\varphi}_{p+1})d\tau=\varphi_p+\dot{\varphi}_p d\tau+\frac{1}{2}\ddot{\varphi}_p d\tau^2 \quad \text{Equation (20).}$$

III. Accounting for Axial and Torsional Stick Conditions

During the numerical simulation, the system can traverse through different, potentially discontinuous modes such as drilling with axial stick ($\dot{u}+v_0=0$) and torsional stick ($\dot{\varphi}+\omega_0=0$). Since the time-stepping algorithm results in jumps across a fixed time interval, the state variables can be monitored at each time step for potential discontinuities that may arise in the system dynamics, such as moving from drilling to stick modes, etc.

The case of axial stick can occur when the axial velocity becomes negative during a given time step ($\dot{u}_{p+1}+v_0<0$). This condition essentially implies that the wearflat is in the process of disengaging from the rock. As the axial velocity becomes zero during the time step [$\tau_p$, $\tau_{p+1}$], the axial dynamics of the system (e.g., Equation (13)) can instantaneously reach an equilibrium state (e.g., the perturbed weight-on-bit can become zero). Consequently, at this time instant, the function g($\dot{u}$) is no longer set-valued, and can be given as g($\dot{u}$)=$-\hat{\delta}$=n[(u−ũ)−$\alpha_0$($\varphi$−$\tilde{\varphi}$)].

Since this function still models the frictional component of the bit-rock interaction, in some implementations, its value may not exceed that of the set-valued definition (e.g., g($\dot{u}$)∈[−$\lambda$, 0]). Therefore, for the system to remain in axial stick henceforth (e.g., until the axial velocity becomes positive), the perturbed depth of cut $\hat{\delta}$ can be in the interval [0, $\lambda$]. Consequently, the torsional dynamics can proceed forward with the modified TOB, while the axial dynamics can remain in equilibrium. The system can then come out of axial stick when the depth-of-cut is equal to the steady-state depth of cut (e.g., $\hat{\delta}$=0).

On the other hand, if axial equilibrium cannot be satisfied when the axial velocity becomes zero, then the wearflat disengages from the rock, and the WOB and TOB can be updated accordingly (g($\dot{u}$)=−$\lambda$). In this case, there is no need to update the system at the intermediate step corresponding to the instant when the axial velocity becomes zero.

When the rotational speed of the system becomes negative ($\dot{\varphi}+\omega_0<0$), the drilling process can be stopped. This state is referred to as torsional stick ($\dot{\varphi}+\omega_0=0$), and the system remains in torsional and axial equilibrium until the torque supplied at the top end becomes sufficient to provide the cutting and frictional torque to drill again. This information about the torque supplied at the top end can be used to determine the time instant at which the bit starts to slip (e.g., drill again), and can be expressed as $\tau_{slip}=[\tau_{stick}+\varphi_{stick}+\mathcal{T}(\tau_{stick})-\mathcal{T}_0]/\omega_0$, where $\tau_{stick}$ and $\tau_{slip}$ refer to the time instances when the bit stops moving and starts slipping, respectively. Therefore, if backward rotation of the bit is encountered in a given time interval, then the axial and torsional dynamics can be maintained in equilibrium at all further time instances until the interval corresponding to the slip time ($\tau_q<\tau_{slip}<\tau_{q+1}$).

IV. Adaptive Time-Stepping Angle-Based Numerical Simulation

To design an adaptive time-stepping scheme that remains explicit, an invariant parameter can be determined that will guide the forward-marching scheme (e.g., a system parameter that will remain constant and guide the estimation of time step at every instant of the numerical simulation). In the case of drilling systems, the total angular displacement or the incremental angular displacement serves as the de facto invariant parameter (e.g., it is possible to mandate that during every incremental step of the numerical simulation the angular distance covered by the drag bit be constant). In other words, the time step can be adaptively chosen such that the incremental angular displacement between two consecutive time instances remains the same, irrespective of the states that the drilling system may encounter (e.g., drilling/axial stick/torsional stick).

To elaborate the numerical technique using the above mentioned approach, consider the incremental angular displacement ($\Phi_{p+1}-\Phi_p$) between two instances $\tau_p$ and $\tau_{p+1}$, which can be derived for the RK2M algorithm as:

$$\phi_{p+1}=\varphi_{p+1}+\omega_0\tau_{p+1}=\tilde{\varphi}_p+(\omega_0+\dot{\varphi}_p)d\tau+\frac{1}{2}\ddot{\varphi}_p d\tau^2 \Rightarrow$$
$$\Delta\phi_{p/p+1}=(\omega_0+\dot{\varphi}_p)d\tau+\frac{1}{2}\ddot{\varphi}_p d\tau^2 \qquad \text{Equation (21)}.$$

From Equation (21), it can be seen that the incremental angular displacement in moving from p→p+1 is determined by the state variables at p and the time step d$\tau$. Therefore, by specifying one of the variables ($\Delta\Phi/\tau$), the other can be determined uniquely.

A byproduct of employing the adaptive time-stepping technique using the angle based method is that, the delayed variables ũ and $\tilde{\varphi}$ at any time instant can be directly extracted from the history of stored values, as opposed to carrying out a search. In other words:

$$\tilde{u}_p = u_{p-q}, \tilde{\varphi}_p = \varphi_{p-q}; \text{ where } q = \frac{2\pi}{n\Delta\phi}. \qquad \text{Equation (22)}$$

This ability to eliminate the search process in estimating the delayed state variables can decrease the time step further (e.g., by reducing the incremental angular displacement) without compromising on the computational time of the algorithm.

In some cases, Equation (21) can be invalid when the system encounters axial or torsional stick conditions. While axial stick conditions can be treated similarly to the standard time-based algorithms, for torsional stick, the algorithm may be modified to take into account the fact that the angular displacement does not change during stick-slip.

Figure 9:
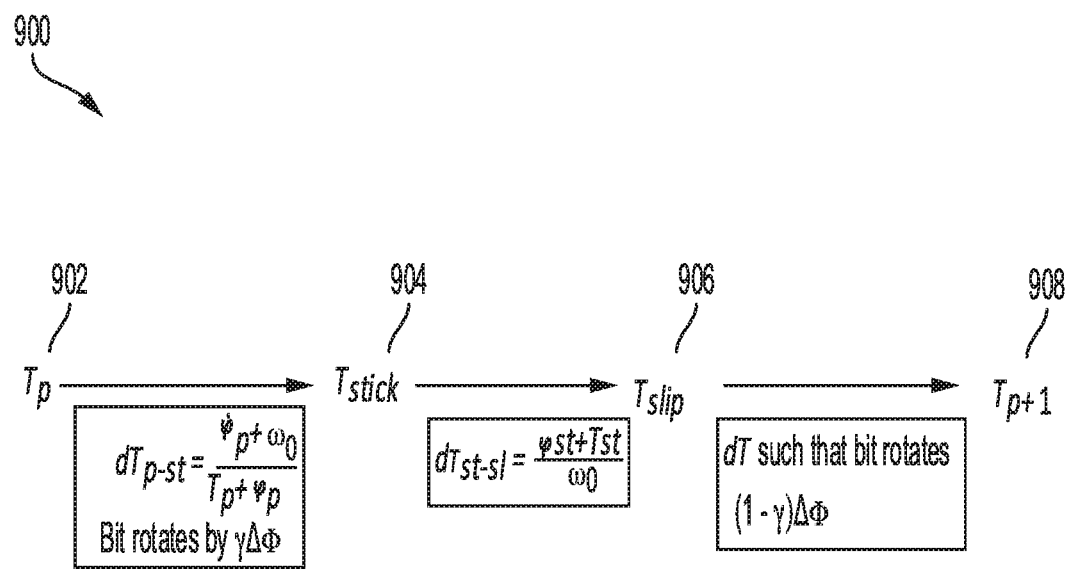
FIG. 9 is a diagram of an example adaptive time-stepping scheme implemented for a particular time instance when torsional stick conditions are encountered, in accordance with some examples.

FIG. 9 illustrates an example of such procedure for a particular time instance when torsional stick is encountered. As seen in the example adaptive time step process 900 in FIG. 9, the bit first rotates (902) until it reaches a stick condition (904), which is determined by the current state. A time increment is then determined (906) such that the torque supplied at the top end causes the system to slip. From this state, the additional time increment to cover the remaining angular increment is determined (908).

Figure 10A:
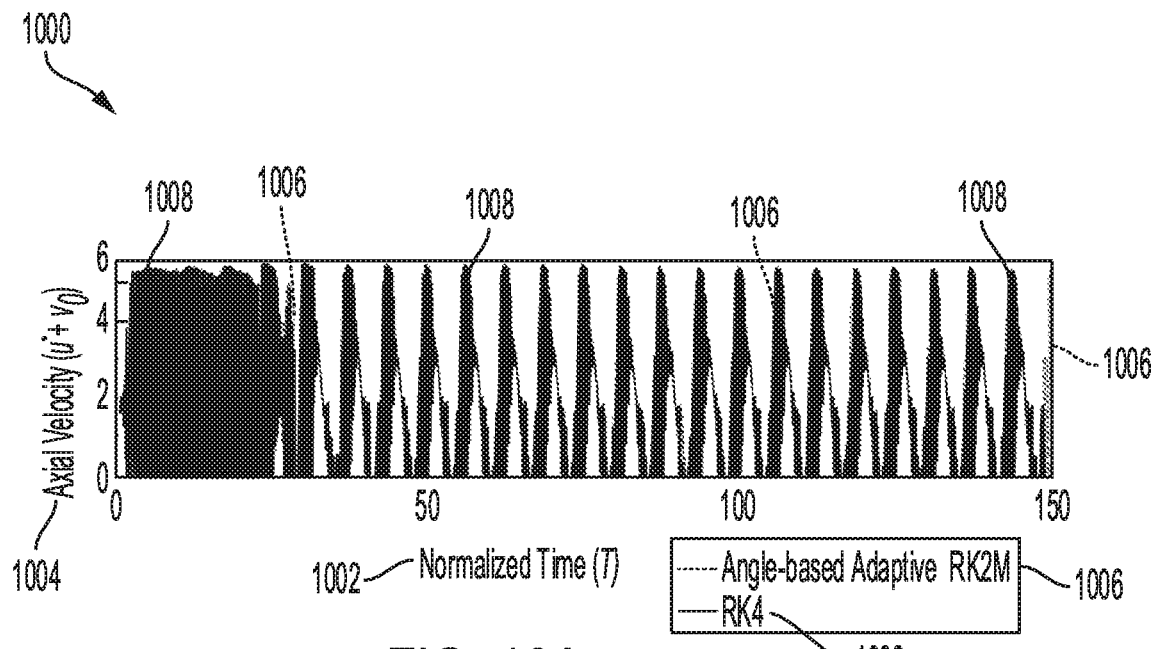
FIGS. 10A and 10B are charts plotting example time histories of axial velocities obtained using example time and angle-based adaptive algorithms, in accordance with some examples.
Figure 10B:
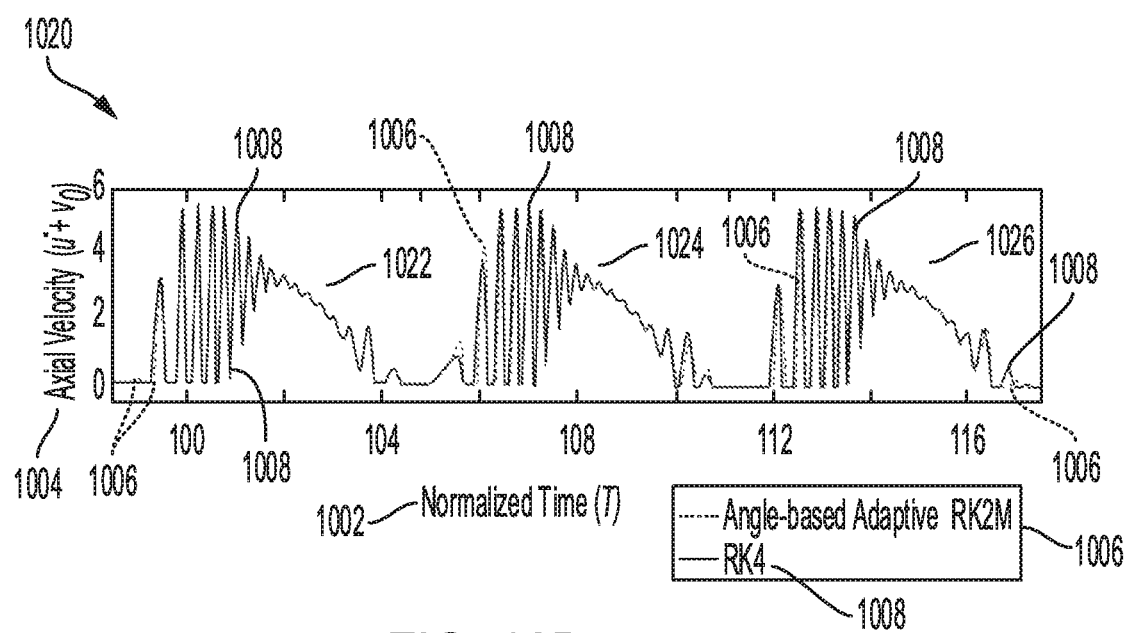

The results obtained from the numerical simulation using the angle-based adaptive time-stepping scheme can be compared with the standard RK4 algorithm, and the axial velocity obtained as shown in FIGS. 10A and 10B. FIG. 10A illustrates a time history 1000 of axial velocities 1006 and 1008 obtained using the time and angle-based adaptive algorithms (e.g., RK2M algorithm and RK4 algorithm) for n=6, $\psi$=50, $\beta$=0.3, $\omega_0$=W$_0$=7, $\lambda$=5. The axial velocities 1006 and 1008 in the time history 1000 are plotted along a time axis 1002 representing normalized time and an axial velocity axis 1004.

FIG. 10B illustrates a history 1020 of the axial velocities 1006 and 1008 across three periods 1022, 1024, 1026 of the limit cycle. As can be seen in FIGS. 10A and 10B, the fast dynamics of the axial velocity and the period of the limit cycle can be recovered accurately.

V. Angle-Based Simulation for Asymmetric Drag Bits

In Equation (13) and Equation (14) illustrated above, the drag bit is assumed to include n number of equally distributed blades, which results in a single time delay. However, realistic drag bits can be asymmetric or include multiple cutters, which can prompt a need to determine multiple time delays (and associated state variables). In such circumstances, the angle-based algorithm can provide immense benefits as the multiple delay parameters to be determined can be simply inferred from the history of state variables. To illustrate, consider a drag bit made of n blades in which the angle between all the blades are different. For this blade, the equation to determine the delayed state variables at any time instant of simulation can be represented as follows:

$$\tilde{u}_{p_i} = u_{p-q_i} \tilde{\varphi}_{p_i} = \varphi_{p-q_i}; \text{ where}$$
$$q_i = \frac{2\pi}{n\Delta\phi_i} i = 1, \ldots, n.$$

Equation (23)

4. Cutter Projections

The following describes example procedures for projecting cutter faces for modeling bit/rock interactions. Given the angular and axial speeds ($\Omega$ and V, respectively) of cutter i when its center is at angular position $\Phi$, the cutter face is projected onto a plane perpendicular to the cutter velocity and passing through the cutter center. FIG. 11A illustrates an example procedure for cutter projections.

In FIG. 11A, the coordinates for the cutter center $C_i$ of cutter 1102 (cutter i) are given by position vector $\vec{c}_i = (x_i^c, y_i^c, z_i^c)$. The cutter radius, often constant, is denoted as $a_i$. Each cutter face is approximated by a polygon composed of K nodes. An angle array $\{\theta_k\}$, (k=1, 2, ..., K) is defined such that $$\theta_k = \frac{2\pi k}{K}.$$

For cutter 1102 (cutter i), a pair of orthogonal bases $\vec{\mu}_i$ and $\vec{v}_i$ can be found for the null space (illustrated by plane EFGH) of cutter normal $\vec{n}_i^c$. With these, the coordinates for the k-th polygonal nodes $Q_{i,k}$ can be given by vector $\vec{q}_{i,k}$ as follows:

$$\vec{q}_{i,k} = \vec{c}_i + a_i \vec{\mu}_i \cos\theta_k + a_i \vec{v}_i \sin\theta_k \quad \text{Equation (24).}$$

Figure 11B:
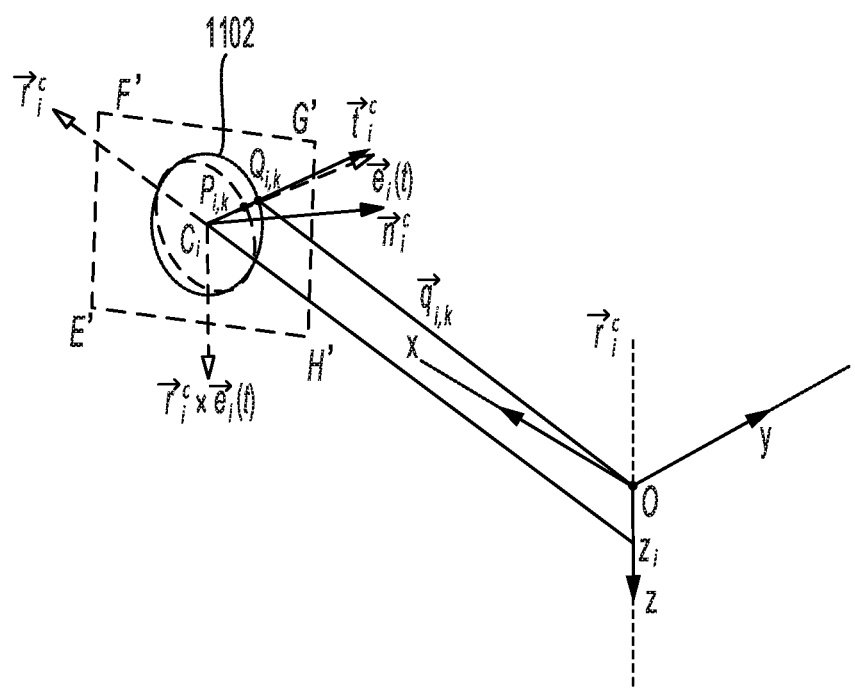

In FIG. 11B, in addition to $\vec{n}_i^c$, other fixed vectors related to the cutter layout can be determined. The radial direction, along $Z_i C_i$ in the figure is given by:

$$\vec{r}_i^c = \frac{1}{\sqrt{(x_i^c)^2 + (y_i^c)^2}} \begin{pmatrix} x_i^c \\ y_i^c \\ 0 \end{pmatrix}. \quad \text{Equation (25)}$$

The tangential direction (related to the pure bit rotation) is given by:

$$\vec{t}_i^c = -\vec{r}_i^c \times \vec{e}_z, \text{ where } \vec{e}_z = (0,0,1)^T \quad \text{Equation (26).}$$

The cutter velocity can be expressed as:

$$\vec{v}_i(t) = \Omega(t)\vec{t}_i^c \sqrt{(x_i^c)^2 + (y_i^c)^2} + V(t)\vec{e}_z \quad \text{Equation (27).}$$

Accordingly, the direction of cutter velocity reads as follows:

$$\vec{e}_i(t) = \frac{\vec{v}_i}{\|\vec{v}_i\|}. \quad \text{Equation (28)}$$

This direction is time-dependent and related to bit motion. Vectors $\vec{r}_i^c$ and $\vec{r}_i^c \times \vec{e}_i$ form a pair of orthogonal bases for the plane perpendicular to the cutter velocity (referred to as "projection plane", illustrated by plane E'F'G'H' in FIG. 11B). The objective is to determine, for each node $Q_{i,k}$ in FIG. 11A, the corresponding projection $P_{i,k}$ on this projection plane.

The first step can involve finding the component of $\vec{q}_{i,k}$ that lies within the projection plane. Denoted by $\vec{p}_{i,k}$, this in-plane component is determined by:

$$\vec{p}_{i,k}(t) = \vec{q}_{i,k} - \vec{e}_i(t) \vec{q}_{i,k} \cdot \vec{e}_i(t) \quad \text{Equation (29),}$$

which is the vector from O' to $P_{i,k}$. Here O' is the projection of the coordinate origin O onto the projection plane.

Figure 11C:
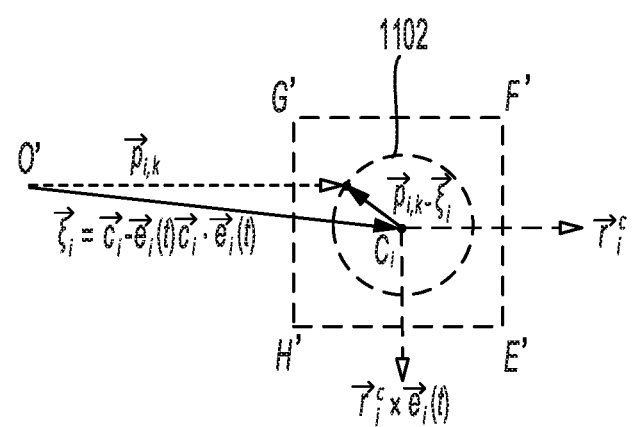

FIG. 11C illustrates a next procedure for determining the cutter projections. Note that both plane EFGH and E'F'G'H' pass through cutter center $C_i$. In the projection plane, the vector pointing from the cutter center $C_i$ to the projected polygonal node $P^{i,k}$ is given by:

$$\vec{p}_{i,k} - \vec{\xi}_i \quad \text{Equation (30),}$$

where $\vec{\xi}_i(t) = \vec{e}_i(t) \vec{c}_i \cdot \vec{e}_i(t)$ is the component of $\vec{c}_i$ that is within the projection plane, as represented by O'C$_i$, which is the projection of OC$_i$ on the projection place (O'C$_i$ and OC$_i$ intersect at $C_i$).

Finally, the nodal coordinates ($r_{i,k}^{bp}$, $z_{i,k}^{bp}$) of the "dynamic" bit profile within the projection plane are given by:

$$\begin{cases} r_{i,k}^{bp} = \sqrt{(x_i^c)^2 + (y_i^c)^2} + (\vec{p}_{i,k} - \vec{\xi}_i) \cdot \vec{r}_i^c \\ z_{i,k}^{bp} = z_i^c + (\vec{p}_{i,k} - \vec{\xi}_i) \cdot (\vec{r}_i^c \times \vec{e}_z) \end{cases} \quad \text{Equation (31)}$$

When the bit performs uniform motion, the projection of a cutter is constant at any angular position $\Phi$. For general bit motion, some approximations can be applied when seeking the cutter projections. Note that vectors $\vec{e}_i$ and $\vec{t}_i^c$ can lie in a plane perpendicular to $\vec{r}_i^c$.

From Equation (27), $\vec{e}_i$ can be approximated by $\vec{t}_i^c$ if:

$$\Omega \sqrt{(x_i^c)^2 + (y_i^c)^2} \gg V \quad \text{Equation (32).}$$

Considering realistic configurations, this holds true. Consequently, $\vec{r}_i^c \times \vec{e}_i = \vec{e}_z$ and since vector $\vec{t}_i$ remains constant, the projection of cutter i is constant irrespective of the bit motion. This explains why it is reasonable to shift the cutter projections in the bit profile (e.g., achieved by rotating the bit without axial advance) to determine the bit/rock interaction for general motion.

Having disclosed some example system components and concepts, the disclosure now turns to FIG. 12, which illustrates an example method 1200 for simulating bit responses. For the sake of clarity, the method 1200 is described in terms of the modeling and analysis system 200, as shown in FIG. 2, configured to practice the method. The steps outlined herein are exemplary and can be implemented in any combination thereof, including combinations that exclude, add, or modify certain steps.

At step 1202, the modeling and analysis system 200 can calculate a profile of a bit (e.g., 300, 400) on a rotary drilling system. The bit can include a plurality of blades 310 and cutters 312. Moreover, the profile of the bit can include a cutter layout representing a collection of cutter faces associated with the plurality of cutters (312).

In some implementations, calculating the profile of the bit can include depicting the bit and a cutter motion on a coordinate system (e.g., a Eulerian coordinate system, a Lagrangian coordinate system, etc.), rotating the bit without axial advance, and projecting a face (e.g., 502) of each cutter ($C_i$) onto a half-plane when a center of the bit crosses the half-plane. Moreover, in some examples, the modeling and analysis system 200 can calculate the profile of the bit based on a number of cutters (312) on the bit, a bit axis of rotation, an axial position of the bit, an angular position of the bit, a cutter face orientation, a cutter radius, a motion of the bit, etc.

At step 1204, based on the profile of the bit, the modeling and analysis system 200 can determine potential cutter interactions between the plurality of cutters (312). In some examples, a potential cutter interaction can be determined when at least two cutters interact (e.g., cut, shear, etc.) with a same portion of a surface (e.g., rock). For example, cutter 1 may interact with cutter 2 if cutter 1 would potentially cut a rock surface created or cut by cutter 2. Cutter interactions can depend on the past and present positions of cutters during a motion or rotation of the bit.

At step 1206, the modeling and analysis system 200 can approximate a cutter geometry of each cutter ($C_i$) using polygon approximation (e.g., polygon clipping). In some implementations, approximating the cutter geometry of each cutter ($C_i$) can include calculating a length and shape of a cutting boundary associated with the cutter ($C_i$).

As previously described, the engagement surface $S_1$ for each cutter can be determined by calculating the intersection of surfaces. In some examples, this operation can be done efficiently when the boundary of the cutter projection on the (r, z) plane is discretized by a polygon with m nodes using "polygon clipping".

Moreover, the projection of a cutter on the (r, z) plane can be affected by the bit motion. However, in some cases, corrections for the bit motion can be generally negligible. Thus, in some cases, the projection of any cutter can be assumed to be identical to the one in the bit profile irrespective of bit motion. This assumption, while optional, can accelerate the calculations since the polygon approximation of the cutter geometry may not be affected by the bit motion.

In some examples, the coordinates (e.g., Cartesian coordinates) of the k-th node of a polygon describing cutter i can be translated into the nodal coordinates ($r_{i,k}$, $z_{i,k}$) on a cutter projection plane. The set of arrays ($\vec{r}_i$, $\vec{z}_i$) containing the coordinates in the projection plane of the nodes of the polygon describing cutter $C_i$ can be denoted by Equation (5), as previously explained.

Based on the potential cutter interactions and the approximated cutter geometry of each cutter cutter ($C_i$), at step 1208, the modeling and analysis system 200 can calculate an engagement surface ($S_i$) for each cutter ($C_i$) using polygon approximation. In some cases, the modeling and analysis system 200 can calculate the engagement surface ($S_i$) for each cutter ($C_i$) at each of the plurality of time steps, as the engagement surfaces may vary with time if the bit motion is not uniform. Moreover, in some examples, the modeling and analysis system 200 can calculate the engagement surface ($S_i$) by determining an intersection of engagement surfaces associated with two or more of the plurality of cutters.

In some implementations, calculating the engagement surface ($S_i$) can include calculating a size and shape of the engagement surface on each cutter ($C_i$). In some cases, the modeling and analysis system 200 can calculate the engagement surface ($S_i$) based on a current angular position of the bit, a current axial position of the bit, an axial bit advance, a time delay, a past axial position of one or more cutters when the one or more cutters were at a current angular position of a respective cutter associated with a respective engagement surface being calculated, etc.

In some examples, the modeling and analysis system 200 can calculate the engagement surface ($S_i$) of a cutter ($C_i$) by projecting nodes of a polygon describing the cutter, shifting the projection of nodes of the polygon describing the cutter to yield a shifted projection of nodes of the polygon, and calculating a difference between the projection of nodes of the polygon and the shifted projection of nodes of the polygon.

Based on one or more geometric parameters associated with the engagement surface ($S_i$) calculated for each cutter ($C_i$), at step 1210, the modeling and analysis system 200 can simulate reaction forces on the bit at each of a plurality of time steps corresponding to constant increments of an angular position of the bit during each revolution of the bit. The reaction forces can, for example, include weight-on-bit and torque-on-bit.

The one or more geometric parameters associated with the engagement surface ($S_i$) can include, for example and without limitation, a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, a ratio between horizontal and vertical cutting forces, and/or a wearflat width.

In some cases, during the simulation, the drilling system can traverse through different, potentially discontinuous modes such as drilling and drilling with axial stick ($\dot{u}+v_0=0$) and torsional stick ($\dot{\varphi}+\omega_0=0$). Since the time-stepping algorithm can result in jumps across a fixed time interval, in some implementations, the modeling and analysis system 200 can monitor state variables at each time step for discontinuities (e.g., axial conditions, torsional stick conditions, etc.) that may arise in the system dynamics. The state variables can include, for example and without limitation, an axial velocity and a rotational speed.

In some cases, when simulating reaction forces, the method 1200 can account for a worn bit or cutter(s). In some examples, this can be done by replacing the circular cutter associated with a bit with a "truncated circle", and changing the wearflat surfaces of the worn cutter(s) accordingly.

Having disclosed example systems, methods, and technologies for simulating PDC responses, the disclosure now turns to FIG. 13, which illustrates an example computing device architecture 1300 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 13 illustrates an example computing device architecture 1300 of a computing device which can implement the various technologies and techniques described herein. For example, the computing device architecture 1300 can implement the modeling and analysis system 200 shown in FIG. 2 and perform various steps, methods, and techniques disclosed herein, such as one or more steps of the process 300 shown in FIG. 3 and/or the method 1300 shown in FIG. 13. The components of the computing device architecture 1300 are shown in electrical communication with each other using a connection 1305, such as a bus. The example computing device architecture 1300 includes a processing unit (CPU or processor) 1310 and a computing device connection 1305 that couples various computing device components including the computing device memory 1315, such as read only memory (ROM) 1320 and random access memory (RAM) 1325, to the processor 1310.

The computing device architecture 1300 can include a cache of high-speed memory connected directly with, in close proximity to, or integrated as part of the processor 1310. The computing device architecture 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other computing device memory 1315 may be available for use as well. The memory 1315 can include multiple different types of memory with different performance characteristics. The processor 1310 can include any general purpose processor and a hardware or software service, such as service 1 1332, service 2 1334, and service 3 1336 stored in storage device 1330, configured to control the processor 1310 as well as a special-purpose processor where software instructions are incorporated into the processor design. The processor 1310 may be a self-contained system, containing multiple cores or processors, a bus, memory controller, cache, etc. A multi-core processor may be symmetric or asymmetric.

To enable user interaction with the computing device architecture 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art, such as a display, projector, television, speaker device, etc. In some instances, multimodal computing devices can enable a user to provide multiple types of input to communicate with the computing device architecture 1300. The communications interface 1340 can generally govern and manage the user input and computing device output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof. The storage device 1330 can include services 1332, 1334, 1336 for controlling the processor 1310. Other hardware or software modules are contemplated. The storage device 1330 can be connected to the computing device connection 1305. In one aspect, a hardware module that performs a particular function can include the software component stored in a computer-readable medium in connection with the necessary hardware components, such as the processor 1310, connection 1305, output device 1335, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising calculating a profile of a bit on a rotary drilling system, wherein the bit comprises a plurality of cutters, the profile of the bit comprising a cutter layout representing a collection of cutter faces associated with the plurality of cutters; based on the profile of the bit, determining potential cutter interactions between the plurality of cutters, wherein a potential cutter interaction is determined when at least two cutters interact with a same portion of a surface; approximating a cutter geometry of each cutter using polygon approximation; based on the potential cutter interactions and the approximated cutter geometry of each cutter, calculating an engagement surface for each cutter using polygon approximation; and based on one or more geometric parameters associated with the engagement surface calculated for each cutter, simulating, via one or more processors, reaction forces on the bit at each of a plurality of time steps corresponding to constant increments of an angular position of the bit during each revolution of the bit, the reaction forces comprising weight-on-bit and torque-on-bit.

Statement 2: A method according to Statement 1, wherein calculating the engagement surface comprises calculating a size and shape of the engagement surface on each cutter, and wherein approximating the cutter geometry of each cutter comprises calculating a length and shape of a cutting boundary associated with the cutter.

Statement 3: A method according to any of Statements 1 and 2, wherein the engagement surface for each cutter is calculated at each of the plurality of time steps, and wherein the bit comprises a drag bit.

Statement 4: A method according to any of Statements 1 through 3, wherein calculating the profile of the bit comprises: depicting the bit and a cutter motion on a coordinate system; rotating the bit without axial advance; and projecting a face of each cutter onto a half-plane when a center of the bit crosses the half-plane.

Statement 5: A method according to any of Statements 1 through 4, wherein the bit profile is calculated based on at least one of a number of cutters on the bit, a bit axis of rotation, an axial position of the bit, an angular position of the bit, a cutter face orientation, a cutter radius, and a motion of the bit.

Statement 6: A method according to any of Statements 1 through 5, wherein calculating the engagement surface comprises calculating an intersection of engagement surfaces associated with two or more of the plurality of cutters.

Statement 7: A method according to any of Statements 1 through 6, wherein the engagement surface is calculated based on at least one of a current angular position of the bit, a current axial position of the bit, an axial bit advance, a time delay, and a past axial position of one or more cutters when the one or more cutters were at a current angular position of a respective cutter associated with a respective engagement surface being calculated.

Statement 8: A method according to any of Statements 1 through 7, wherein calculating the engagement surface comprises: shifting a projection of nodes of a polygon describing the cutter to yield a shifted projection of nodes of the polygon; and calculating a difference between the projection of nodes of the polygon and the shifted projection of nodes of the polygon.

Statement 9: A method according to any of Statements 1 through 8, wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

Statement 10: A method according to any of Statements 1 through 9, further comprising monitoring state variables at each time step for axial and torsional stick conditions, the state variables comprising at least one of an axial velocity and a rotational speed.

Statement 11: A system comprising one or more processors and at least one computer-readable storage medium having stored therein instructions which, when executed by the one or more processors, cause the system to: calculate a profile of a bit on a rotary drilling system, wherein the bit comprises a plurality of cutters, the profile of the bit comprising a cutter layout representing a collection of cutter faces associated with the plurality of cutters; based on the profile of the bit, determine potential cutter interactions between the plurality of cutters, wherein a potential cutter interaction is determined when at least two cutters interact with a same portion of a surface; approximate a cutter geometry of each cutter using polygon approximation; based on the potential cutter interactions and the approximated cutter geometry of each cutter, calculate an engagement surface for each cutter using polygon approximation; and based on one or more geometric parameters associated with the engagement surface calculated for each cutter, simulate reaction forces on the bit at each of a plurality of time steps corresponding to constant increments of an angular position of the bit during each revolution of the bit, the reaction forces comprising weight-on-bit and torque-on-bit.

Statement 12: A system according to Statement 11, wherein calculating the engagement surface comprises calculating a size and shape of the engagement surface on each cutter, and wherein approximating the cutter geometry of each cutter comprises calculating a length and shape of a cutting boundary associated with the cutter.

Statement 13: A system according to any of Statements 11 and 12, wherein calculating the engagement surface comprises calculating a size and shape of the engagement surface on each cutter, and wherein approximating the cutter geometry of each cutter comprises calculating a length and shape of a cutting boundary associated with the cutter.

Statement 14: A system according to any of Statements 11 through 13, wherein the engagement surface for each cutter is calculated at each of the plurality of time steps, and wherein the bit comprises a drag bit.

Statement 15: A system according to any of Statements 11 through 14, wherein calculating the profile of the bit comprises: depicting the bit and a cutter motion on a coordinate system; rotating the bit without axial advance; and projecting a face of each cutter onto a half-plane when a center of the bit crosses the half-plane.

Statement 16: A system according to any of Statements 11 through 15, wherein the bit profile is calculated based on at least one of a number of cutters on the bit, a bit axis of rotation, an axial position of the bit, an angular position of the bit, a cutter face orientation, a cutter radius, and a motion of the bit.

Statement 17: A system according to any of Statements 11 through 16, wherein calculating the engagement surface comprises calculating an intersection of engagement surfaces associated with two or more of the plurality of cutters.

Statement 18: A system according to any of Statements 11 through 17, wherein the engagement surface is calculated based on at least one of a current angular position of the bit, a current axial position of the bit, an axial bit advance, a time delay, and a past axial position of one or more cutters when the one or more cutters were at a current angular position of a respective cutter associated with a respective engagement surface being calculated.

Statement 19: A system according to any of Statements 11 through 18, wherein calculating the engagement surface comprises: shifting a projection of nodes of a polygon describing the cutter to yield a shifted projection of nodes of the polygon; and calculating a difference between the projection of nodes of the polygon and the shifted projection of nodes of the polygon.

Statement 20: A system according to any of Statements 11 through 19, wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

Statement 21: A system according to any of Statements 11 through 20, the at least one computer-readable storage medium storing additional instructions which, when executed by the one or more processors, cause the one or more processors to monitor state variables at each time step for axial and torsional stick conditions, the state variables comprising at least one of an axial velocity and a rotational speed.

Statement 22: A non-transitory computer-readable storage medium comprising instructions stored on the non-transitory computer-readable storage medium, the instructions, when executed by one more processors, cause the one or more processors to: calculate a profile of a bit on a rotary drilling system, wherein the bit comprises a plurality of cutters, the profile of the bit comprising a cutter layout representing a collection of cutter faces associated with the plurality of cutters; based on the profile of the bit, determine potential cutter interactions between the plurality of cutters, wherein a potential cutter interaction is determined when at least two cutters interact with a same portion of a surface; approximate a cutter geometry of each cutter using polygon approximation; based on the potential cutter interactions and the approximated cutter geometry of each cutter, calculate an engagement surface for each cutter using polygon approximation; and based on one or more geometric parameters associated with the engagement surface calculated for each cutter, simulate reaction forces on the bit at each of a plurality of time steps corresponding to constant increments of an angular position of the bit during each revolution of the bit, the reaction forces comprising weight-on-bit and torque-on-bit.

Statement 23: A non-transitory computer-readable storage medium according to Statement 22, wherein calculating the engagement surface comprises calculating a size and shape of the engagement surface on each cutter, and wherein approximating the cutter geometry of each cutter comprises calculating a length and shape of a cutting boundary associated with the cutter.

Statement 24: A non-transitory computer-readable storage medium according to any of Statements 22 and 23, wherein the engagement surface for each cutter is calculated at each of the plurality of time steps, and wherein the bit comprises a drag bit.

Statement 25: A non-transitory computer-readable storage medium according to any of Statements 22 through 24, wherein calculating the profile of the bit comprises: depicting the bit and a cutter motion on a coordinate system; rotating the bit without axial advance; and projecting a face of each cutter onto a half-plane when a center of the bit crosses the half-plane.

Statement 26: A non-transitory computer-readable storage medium according to any of Statements 22 through 25, wherein the bit profile is calculated based on at least one of a number of cutters on the bit, a bit axis of rotation, an axial position of the bit, an angular position of the bit, a cutter face orientation, a cutter radius, and a motion of the bit.

Statement 27: A non-transitory computer-readable storage medium according to any of Statements 22 through 26, wherein calculating the engagement surface comprises calculating an intersection of engagement surfaces associated with two or more of the plurality of cutters.

Statement 28: A non-transitory computer-readable storage medium according to any of Statements 22 through 27, wherein the engagement surface is calculated based on at least one of a current angular position of the bit, a current axial position of the bit, an axial bit advance, a time delay, and a past axial position of one or more cutters when the one or more cutters were at a current angular position of a respective cutter associated with a respective engagement surface being calculated.

Statement 29: A non-transitory computer-readable storage medium according to any of Statements 22 through 28, wherein calculating the engagement surface comprises: shifting a projection of nodes of a polygon describing the cutter to yield a shifted projection of nodes of the polygon; and calculating a difference between the projection of nodes of the polygon and the shifted projection of nodes of the polygon.

Statement 30: A non-transitory computer-readable storage medium according to any of Statements 22 through 29, wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

Statement 31: A non-transitory computer-readable storage medium according to any of Statements 22 through 30, further comprising instructions stored thereon which, when executed by the one more processors, cause the one or more processors to monitor state variables at each time step for axial and torsional stick conditions, the state variables comprising at least one of an axial velocity and a rotational speed.

Statement 32: A system comprising means for performing a method according to any of Statements 1 through 10.

What is claimed is:

1. A method comprising:
    calculating a profile of a bit on a rotary drilling system, wherein the bit comprises a plurality of cutters, the profile of the bit comprising a cutter layout representing a collection of cutter faces associated with the plurality of cutters;
    based on the profile of the bit, determining potential cutter interactions between the plurality of cutters, wherein a potential cutter interaction is determined when at least two cutters interact with a same portion of a formation surface;
    approximating a cutter geometry of each cutter using polygon approximation;
    based on the potential cutter interactions and the approximated cutter geometry of each cutter, calculating an engagement surface for each cutter using polygon approximation, wherein calculating the engagement surface comprises:
        shifting a projection of nodes of a polygon describing the cutter to yield a shifted projection of nodes of the polygon; and calculating a difference between the projection of nodes of the polygon and the shifted projection of nodes of the polygon; and based on one or more geometric parameters associated with the engagement surface calculated for each cutter, simulating, via one or more processors, reaction forces on the bit at each of a plurality of time steps corresponding to constant increments of an angular position of the bit during each revolution of the bit, the reaction forces comprising weight-on-bit and torque-on-bit.

2. The method of claim 1, wherein calculating the engagement surface comprises calculating a size and shape of the engagement surface on each cutter, and wherein approximating the cutter geometry of each cutter comprises calculating a length and shape of a cutting boundary associated with the cutter.

3. The method of claim 1, wherein the engagement surface for each cutter is calculated at each of the plurality of time steps, and wherein the bit comprises a drag bit.

4. The method of claim 1, wherein calculating the profile of the bit comprises:
depicting the bit and a cutter motion on a coordinate system;
rotating the bit without axial advance; and
projecting a face of each cutter onto a half-plane when a center of the bit crosses the half-plane.

5. The method of claim 4, wherein the bit profile is calculated based on at least one of a number of cutters on the bit, a bit axis of rotation, an axial position of the bit, an angular position of the bit, a cutter face orientation, a cutter radius, and a motion of the bit.

6. The method of claim 1, wherein calculating the engagement surface comprises calculating an intersection of engagement surfaces associated with two or more of the plurality of cutters.

7. The method of claim 1, wherein the engagement surface is calculated based on at least one of a current angular position of the bit, a current axial position of the bit, an axial bit advance, a time delay, and a past axial position of one or more cutters when the one or more cutters were at a current angular position of a respective cutter associated with a respective engagement surface being calculated.

8. The method of claim 1, wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

9. The method of claim 1, further comprising monitoring state variables at each time step for axial and torsional stick conditions, the state variables comprising at least one of an axial velocity and a rotational speed.

10. A system comprising:
one or more processors; and
at least one computer-readable storage medium having stored therein instructions which, when executed by the one or more processors, cause the system to:
calculate a profile of a bit on a rotary drilling system, wherein the bit comprises a plurality of cutters, the profile of the bit comprising a cutter layout representing a collection of cutter faces associated with the plurality of cutters;
based on the profile of the bit, determine potential cutter interactions between the plurality of cutters, wherein a potential cutter interaction is determined when at least two cutters interact with a same portion of a formation surface;
approximate a cutter geometry of each cutter using polygon approximation;
based on the potential cutter interactions and the approximated cutter geometry of each cutter, calculate an engagement surface for each cutter using polygon approximation, wherein calculating the engagement surface comprises:
shifting a projection of nodes of a polygon describing the cutter to yield a shifted projection of nodes of the polygon; and
calculating a difference between the projection of nodes of the polygon and the shifted projection of nodes of the polygon; and
based on one or more geometric parameters associated with the engagement surface calculated for each cutter, simulate reaction forces on the bit at each of a plurality of time steps corresponding to constant increments of an angular position of the bit during each revolution of the bit, the reaction forces comprising weight-on-bit and torque-on-bit.

11. The system of claim 10, wherein calculating the engagement surface comprises calculating a size and shape of the engagement surface on each cutter, and wherein approximating the cutter geometry of each cutter comprises calculating a length and shape of a cutting boundary associated with the cutter.

12. The system of claim 10, wherein the engagement surface for each cutter is calculated at each of the plurality of time steps, and wherein calculating the engagement surface comprises calculating an intersection of engagement surfaces associated with two or more of the plurality of cutters.

13. The system of claim 10, wherein calculating the profile of the bit comprises:
depicting the bit and a cutter motion on a coordinate system;
rotating the bit without axial advance; and
projecting a face of each cutter onto a half-plane when a center of the bit crosses the half-plane.

14. The system of claim 13, wherein the bit profile is calculated based on at least one of a number of cutters on the bit, a bit axis of rotation, an axial position of the bit, an angular position of the bit, a cutter face orientation, a cutter radius, and a motion of the bit, and wherein the engagement surface is calculated based on at least one of a current angular position of the bit, a current axial position of the bit, an axial bit advance, a time delay, and a past axial position of one or more cutters when the one or more cutters were at a current angular position of a respective cutter associated with a respective engagement surface being calculated.

15. The system of claim 10, the at least one computer-readable storage medium storing additional instructions which, when executed by the one or more processors, cause the one or more processors to:
monitor state variables at each time step for axial and torsional stick conditions, the state variables comprising at least one of an axial velocity and a rotational speed; and
wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

16. A non-transitory computer-readable storage medium comprising:

instructions stored on the non-transitory computer-readable storage medium, the instructions, when executed by one more processors, cause the one or more processors to:

calculate a profile of a bit on a rotary drilling system, wherein the bit comprises a plurality of cutters, the profile of the bit comprising a cutter layout representing a collection of cutter faces associated with the plurality of cutters;

based on the profile of the bit, determine potential cutter interactions between the plurality of cutters, wherein a potential cutter interaction is determined when at least two cutters interact with a same portion of a formation surface;

approximate a cutter geometry of each cutter using polygon approximation;

based on the potential cutter interactions and the approximated cutter geometry of each cutter, calculate an engagement surface for each cutter using polygon approximation; and based on one or more geometric parameters associated with the engagement surface calculated for each cutter, simulate reaction forces on the bit at each of a plurality of time steps corresponding to constant increments of an angular position of the bit during each revolution of the bit, the reaction forces comprising weight-on-bit and torque-on-bit, wherein the engagement surface for each cutter is calculated at each of the plurality of time steps, and wherein calculating the engagement surface comprises calculating an intersection of engagement surfaces associated with two or more of the plurality of cutters by:

shifting a projection of nodes of a polygon describing the cutter to yield a shifted projection of nodes of the polygon; and calculating a difference between the projection of nodes of the polygon and the shifted projection of nodes of the polygon.

17. The non-transitory computer-readable storage medium of claim 16, further comprising instructions stored thereon which, when executed by the one more processors, cause the one or more processors to:

monitor state variables at each time step for axial and torsional stick conditions, the state variables comprising at least one of an axial velocity and a rotational speed; and wherein the one or more geometric parameters associated with the engagement surface comprise at least one of a cut area, a distance from an axis of rotation to a centroid of the engagement surface, an arc length of a cutting edge associated with the engagement surface, a radial length of the cutting edge, an intrinsic specific energy for cutting a unit volume of surface material, a ratio between vertical and horizontal cutting forces, and a wearflat width.

* * * * *